United States Patent
Kawauchi et al.

(10) Patent No.: US 8,451,966 B2
(45) Date of Patent: May 28, 2013

(54) INFORMATION PROCESSOR AND INFORMATION PROCESSING METHOD, DISPLAY DEVICE, AND PROGRAM

(75) Inventors: Hidetoshi Kawauchi, Kangawa (JP); Toshiyuki Miyauchi, Kanagawa (JP); Takashi Yokokawa, Kanagawa (JP); Takuya Okamoto, Chiba (JP); Hiroyuki Kamata, Kanagawa (JP)

(73) Assignee: Sony Corporation, Tokyo (JP)

( * ) Notice: Subject to any disclaimer, the term of this patent is extended or adjusted under 35 U.S.C. 154(b) by 901 days.

(21) Appl. No.: 12/567,837

(22) Filed: Sep. 28, 2009

(65) Prior Publication Data

US 2010/0080329 A1    Apr. 1, 2010

(30) Foreign Application Priority Data

Sep. 29, 2008   (JP) ................. P2008-250285

(51) Int. Cl.
*H03D 1/06*   (2006.01)
*H03K 5/01*   (2006.01)
*H03K 5/159*  (2006.01)

(52) U.S. Cl.
USPC ........... 375/348; 375/316; 375/346; 375/229

(58) Field of Classification Search
USPC ............. 375/343, 362, 260, 364, 366, 316, 375/324, 326, 340, 295, 219, 220, 222, 240.26–240.29, 373, 278, 284, 285, 322, 375/339, 338, 346, 347, 348; 370/8, 209, 370/210, 205, 503, 509, 510, 350, 506, 519, 370/517, 203, 329, 342, 204, 208
See application file for complete search history.

(56) References Cited

U.S. PATENT DOCUMENTS

| | | | |
|---|---|---|---|
| 6,771,591 B1* | 8/2004 | Belotserkovsky et al. | 370/210 |
| 8,077,646 B1* | 12/2011 | Cendrillon et al. | 370/310 |
| 2004/0091057 A1* | 5/2004 | Yoshida | 375/260 |
| 2004/0228272 A1* | 11/2004 | Hasegawa et al. | 370/210 |
| 2005/0163262 A1 | 7/2005 | Gupta | |
| 2007/0070882 A1* | 3/2007 | Kawauchi et al. | 370/210 |
| 2009/0097576 A1* | 4/2009 | Adachi et al. | 375/260 |
| 2009/0274038 A1* | 11/2009 | Takeuchi et al. | 370/210 |

FOREIGN PATENT DOCUMENTS

| | | |
|---|---|---|
| JP | 2000 22657 | 1/2000 |
| JP | 2003 229833 | 8/2003 |
| JP | 2004 266814 | 9/2004 |
| JP | 2005-303440 | 10/2005 |
| JP | 2007 520167 | 7/2007 |
| WO | WO 2009 122727 | 10/2009 |

* cited by examiner

*Primary Examiner* — Sam K Ahn
*Assistant Examiner* — Linda Wong
(74) *Attorney, Agent, or Firm* — Frommer Lawrence & Haug LLP; William S. Frommer; Ellen Marcie Emas

(57) ABSTRACT

Disclosed herein is an information processor, including: a receiving section configured to receive an OFDM signal transmitted in accordance with an OFDM system; a FFT arithmetically operating section configured to carry out FFT for a signal within a predetermined interval of the OFDM signal; a delay profile estimating section configured to estimate delay profiles from the OFDM signal received by the receiving section; an inter-symbol interference amount estimating section configured to estimate inter-symbol interference amounts for a plurality of candidates for the predetermined interval, respectively, by using the delay profiles estimated by the delay profile estimating section; and a searching section configured to search for the candidate having the minimum inter-symbol interference amount estimated by the inter-symbol interference amount estimating section from among the plurality of candidates in the predetermined interval, and supply data on the candidate thus searched for as the predetermined interval to the FFT arithmetically operating section.

7 Claims, 27 Drawing Sheets

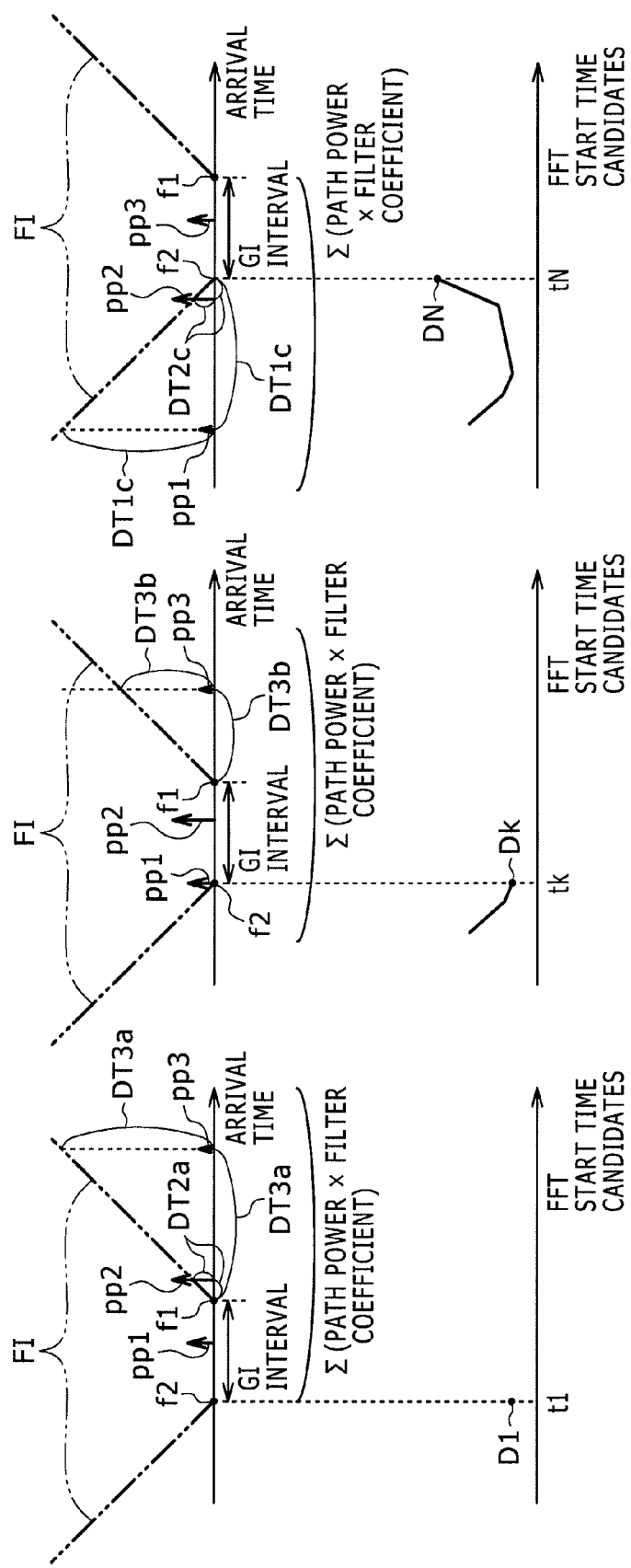

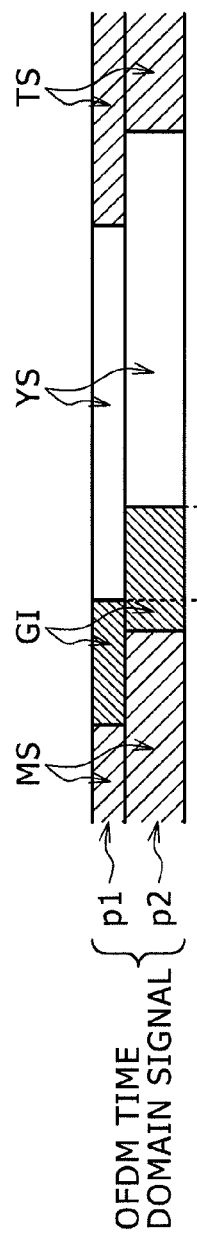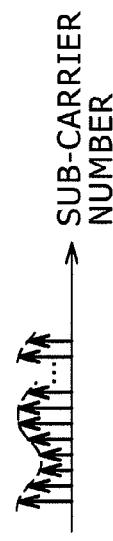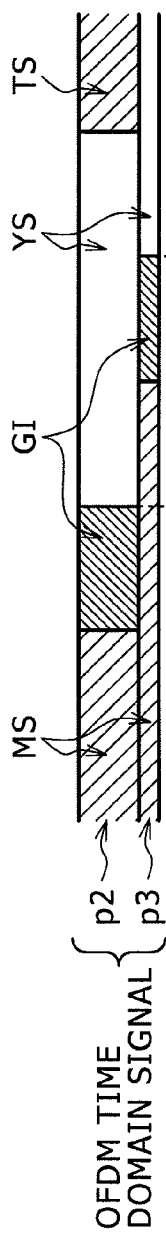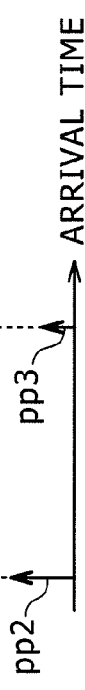

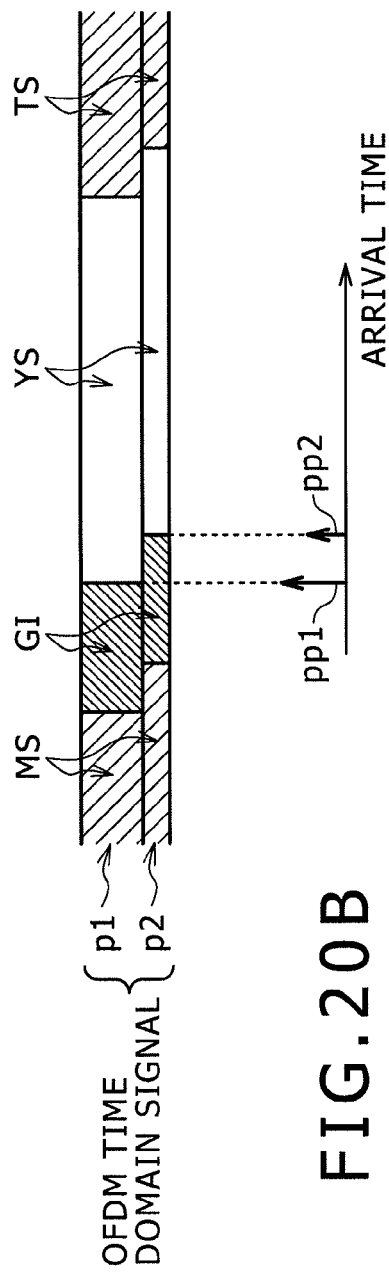
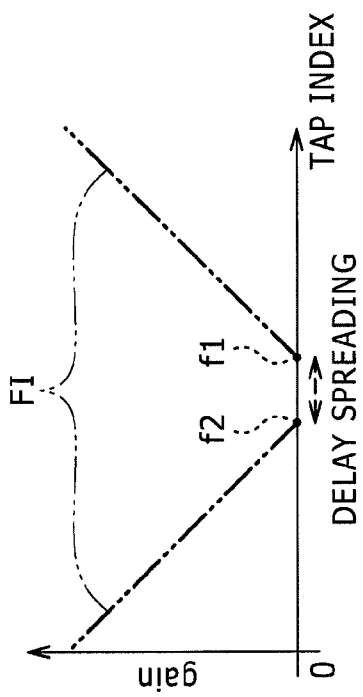
FIG. 20A
FIG. 20B
FIG. 20C

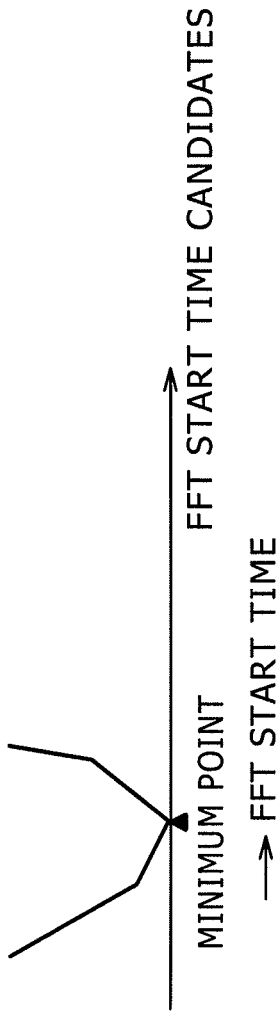
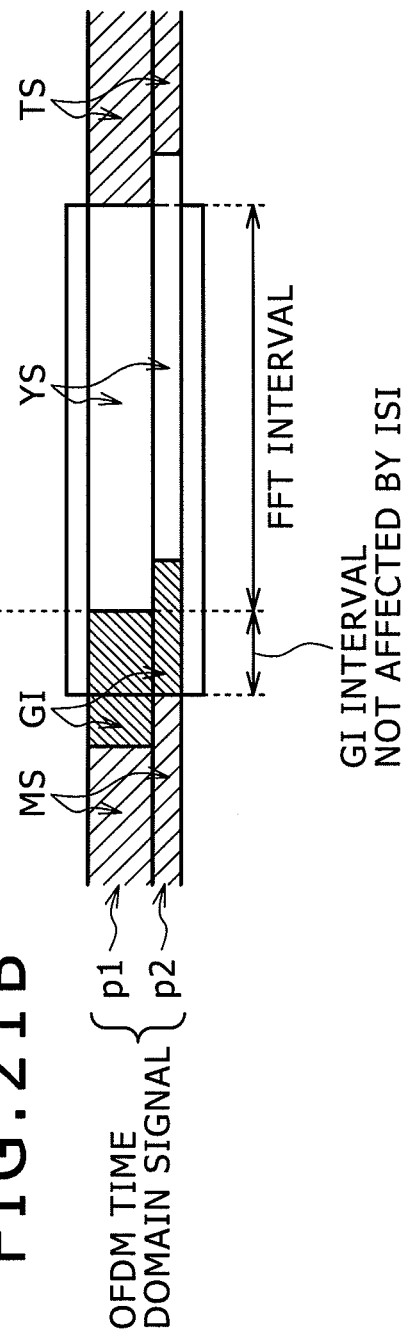
FIG.21A
FIG.21B ant processor and an information processing method, a display device, and a program, and more particularly to an information processor and an information processing method, a display device, and a program each of which is capable of suppressing deterioration of signal quality after completion of execution of FFT (Fast Fourier Transform) processing in OFDM (Orthogonal Frequency Division Multiplexing) demodulation.

2. Description of the Related Art

An Orthogonal Frequency Division Multiplexing (OFDM) system is proposed as a modulation system for terrestrial digital broadcastings. This system, for example, is disclosed in Japanese Patent Laid-Open No. 2005-303440. The OFDM system means a system in which a large number of orthogonal carriers are used, and each of the orthogonal carrier waves is modulated with either Phase Shift Keying (PSK) or Quadrature Amplitude Modulation (QAM).

With the OFDM system, since the entire transmission band is divided into parts for a large number of sub-carriers, the band per one sub-carrier becomes narrow, and a transmission speed becomes slow. However, the OFDM system has the feature that the OFDM system is no different from the existing modulation system when the perspective of a total transmission speed is considered.

In addition, the OFDM system also has the feature that a symbol speed becomes slow because a large number of sub-carriers are transmitted in parallel with one another. For this reason, it is possible to shorten a time length of a multi-path relative to a time length for one symbol. As a result, the OFDM system also has the feature that the OFDM system is hardly influenced by the multi-path.

Moreover, in the OFDM system, data is allocated to a plurality of sub-carriers, respectively. For this reason, a transmission circuit can be configured by using an Inverse Fast Fourier Transform (IFFT) arithmetically operating circuit for carrying out inverse Fourier transform in a phase of modulation. In addition, a reception circuit can be configured by using a Fast Fourier Transform (FFT) arithmetically operating circuit for carrying out Fourier transform in a phase of demodulation.

With the OFDM system, transmission of a signal is carried out by a measure called an OFDM symbol.

FIG. 1 is a diagram showing the OFDM symbol.

As shown in FIG. 1, one OFDM symbol is composed of an effective symbol as a signal interval for which IFFT processing is executed in a phase of transmission, and a guard interval (hereinafter referred to as "a GI") for which a waveform of a part of the second half of the effective symbol is copied. The GI is inserted into a position before the effective symbol on a time axis.

A plurality of OFDM symbols as described above are collected, thereby forming one OFDM transmission frame. For example, an Integrated Services Digital Broadcasting-Terrestrial (ISDB-T) standard is set as a standard for the terrestrial digital broadcastings in Japan. In this ISDB-T standard, one OFDM transmission frame is formed from 204 OFDM symbols.

On a reception side for receiving the OFDM transmission frame, the FFT processing is carried out for the effective symbol of each of the OFDM symbols, thereby carrying out the OFDM modulation.

However, under a multi-path environment, in addition to a dominant wave as a direct wave, a delayed wave which arrives after being delayed by a predetermined time relative to the dominant wave exists in some cases. In such cases, even for the same OFDM symbol, an arrival time is different between the OFDM symbol in the dominant wave, and the OFDM symbol in the delayed wave. Then, there is caused an Inter-Symbol Interference (hereinafter referred to as "an ISI") as an interference between the different OFDM symbols.

When the delayed wave arrives within a time domain not exceeding the GI from the arrival time of the dominant wave, an interval which is not yet affected by the ISI can be utilized as the interval for which the FFT processing is executed. As a result, it is possible to prevent the deterioration of the signal quality after completion of the execution of the FFT processing.

SUMMARY OF THE INVENTION

However, in the case where the delayed wave arrives within a time domain exceeding the GI from the arrival time of the dominant wave, even when any of the intervals is used, the FFT processing is executed for the interval which is already affected by the ISI. Therefore, the signal after completion of the execution of the FFT processing is influenced by the ISI.

The present invention has been made in the light of such circumstances, and it is therefore desirable to provide an information processor and an information processing method, a display device, and a program each of which is capable of suppressing deterioration of signal quality after completion of execution of FFT processing in OFDM modulation.

In order to attain the desire described above, according to an embodiment of the present invention, there is provided an information processor including: a receiving section configured to receive an Orthogonal Frequency Division Multiplexing (OFDM) signal transmitted in accordance with an OFDM system; a Fast Fourier Transform (FFT) arithmetically operating section configured to carry out FFT for a signal within a predetermined interval of the OFDM signal received by the receiving section; a delay profile estimating section configured to estimate delay profiles from the OFDM signal received by the receiving section; an inter-symbol interference amount estimating section configured to estimate inter-symbol interference amounts for a plurality of candidates in the predetermined interval, respectively, by using the delay profiles estimated by the delay profile estimating section; and a searching section configured to search for the candidate having the minimum inter-symbol interference amount estimated by the inter-symbol interference amount estimating section from among the plurality of candidates in the predetermined interval, and supplying data on the candidate thus searched for as the predetermined interval to the FFT arithmetically operating section.

In the inter-symbol interference amount estimating section, a filter in which a filter coefficient representing an inter-symbol interference interval changes in a time direction, and a shape of the change is a downward projecting shape is disposed in each of filter positions corresponding to the plurality of candidates for the predetermined interval, respectively, and filter processing is executed for the delay profiles by using the filter. As a result, it is possible to estimate the inter-symbol interference amounts for the plurality of candidates.

The information processor is further provided with a reference position estimating section configured to estimate a reference position for the delay profiles estimated by the delay profile estimating section; and the inter-symbol interference amount estimating section is made to estimate the delay profiles by using data on the reference position estimated by the reference position estimating section. Thus, the inter-symbol interference amount estimating section enables to estimate the inter-symbol interference amounts by using the delay profiles after completion of the correction.

The information processor is further provided with a delay spreading estimating section configured to estimate delay spreading of the delay profiles estimated by the delay profile estimating section; and the searching section is made to set the plurality of candidates in the predetermined interval as primary selected candidates, is made to select secondary selected candidates based on the delay spreading estimated by the delay spreading estimating section from among the primary selected candidates, and is made to search for the candidate having the minimum inter-symbol interference amount estimated by the inter-symbol interference amount estimating section from among the secondary selected candidates thus selected. Thus, the searching section enables to supply data on the candidate thus searched for as the predetermined interval to the FFT arithmetically operating section.

The information processor is further provided with a delay spreading estimating section configured to estimate delay spreading of the delay profiles estimated by the delay profile estimating section; and the inter-symbol interference amount estimating section is further made to change the shape of the filter in accordance with the delay spreading estimated by the delay spreading estimating section. Thus, the inter-symbol interference amount estimating section enables to execute filter processing for the delay profiles by using the filter after completion of the change.

According to another embodiment of the present invention, there is provided an information processing method including the steps, when an information processor receiving an Orthogonal Frequency Division Multiplexing (OFDM) signal in accordance with an OFDM system carries out Fast Fourier Transform (FFT) for a signal in a predetermined interval of the OFDM signal thus received; estimating delay profiles from the OFDM signal received; estimating inter-symbol interference amounts for a plurality of candidates for the predetermined interval by using the delay profiles thus estimated; and searching for the candidate having the minimum inter-symbol interference amount thus estimated from among the plurality of candidates for the predetermined interval, and determining the candidate thus searched for as the predetermined interval.

According to still another embodiment of the present invention, there is provided a program for instructing a computer for controlling a receiving apparatus for receiving an Orthogonal Frequency Division Multiplexing (OFDM) signal transmitted thereto in accordance with an OFDM system, and carrying out Fast Fourier Transform (FFT) for a signal in a predetermined interval of the OFDM signal thus received to execute control processing, the program including the steps of: estimating delay profiles from the OFDM signal received; estimating inter-symbol interference amounts for a plurality of candidates for the predetermined interval by using the delay profiles thus estimated; and searching for the candidate having the minimum inter-symbol interference amount thus estimated from among the plurality of candidates for the predetermined interval, and determining the candidate thus searched for as the predetermined interval.

In any of the embodiments of the present invention described above, the OFDM signal transmitted in accordance with the OFDM system is received, the Fast Fourier Transform (FFT) is carried out for the signal in the predetermined interval of the OFDM signal thus received, and the delay profiles are estimated from the OFDM signal thus received. Also, the inter-symbol interference amounts for the plurality of candidates in the predetermined interval are estimated by using the delay profiles thus estimated, the candidate having the minimum inter-symbol interference amount thus estimated is searched for from among the plurality of candidates in the predetermined interval, and the candidate thus searched for is determined as the predetermined interval.

According to yet another embodiment of the present invention, there is provided a display device including: a receiving section configured to receive an Orthogonal Frequency Division Multiplexing (OFDM) signal transmitted in accordance with an OFDM system; a Fast Fourier Transform (FFT) arithmetically operating section configured to carry out FFT for a signal within a predetermined interval of the OFDM signal received by the receiving section; a displaying section configured to display thereon an image corresponding to the OFDM signal for which the FFT is carried out by the FFT arithmetically operating section; a delay profile estimating section configured to estimate delay profiles from the OFDM signal received by the receiving section; an inter-symbol interference amount estimating section configured to estimate inter-symbol interference amounts for a plurality of candidates in the predetermined interval, respectively, by using the delay profiles estimated by the delay profile estimating section; and a searching section configured to search for the candidate having the minimum inter-symbol interference amount estimated by the inter-symbol interference amount estimating section from among the plurality of candidates in the predetermined interval, and supplying data on the candidate thus searched for as the predetermined interval to the FFT arithmetically operating section.

In the embodiment of the present invention described above, the OFDM signal transmitted in accordance with the OFDM system is received, the Fast Fourier Transform (FFT) is carried out for the signal in the predetermined interval of the OFDM signal thus received, the image corresponding to the OFDM signal for which the FFT is carried out is displayed, and the delay profiles are estimated from the OFDM signal thus received. Also, the inter-symbol interference amounts for the plurality of candidates in the predetermined interval are estimated by using the delay profiles thus estimated, the candidate having the minimum inter-symbol interference amount thus estimated is searched for from among the plurality of candidates in the predetermined interval, and the candidate thus searched for is determined as the predetermined interval.

According to the present invention, it is possible to suppress the deterioration of the signal quality after completion of the execution of the FFT processing in the OFDM modulation.

BRIEF DESCRIPTION OF THE DRAWINGS

FIGS. 9A, 9C and 9E, and FIGS. 9B, 9D and 9F are respectively graphical representations and time-line charts explaining processing executed by an ISI estimating portion shown in FIG. 5;

FIGS. 12A and 12D, FIGS. 12B and 12E, and FIGS. 12C and 12F are respectively diagrams, time-line charts, and graphical representations explaining a pre-echo and a post-echo;

FIGS. 20A, 20B and 20C are respectively a diagram, a time-line chart, and a graphical representation explaining processing executed by a filter shape variable ISI estimating portion shown in FIG. 19;

FIGS. 21A and 21B are respectively a graphical representation and a diagram showing results of searching for FFT start time candidates by a minimum value searching portion shown in FIG. 19;

DETAILED DESCRIPTION OF THE PREFERRED EMBODIMENTS

Hereinafter, information processors according to four embodiments (hereinafter referred to as first to fourth embodiments, respectively) of the present invention will be mainly described in detail with reference to the accompanying drawings. Therefore, a description will now be given in the following order.

1. First embodiment (an embodiment in which a suitable FFT interval is obtained by using delay profiles).

2. Second embodiment (an embodiment in which the delay profiles are corrected for the purpose of obtaining a proper delay profile).

3. Third embodiment (an embodiment in which an FFT interval suitable for executing FFT window processing is obtained).

4. Fourth embodiment (another embodiment in which the FFT interval suitable for executing the FFT window processing is obtained).

1. First Embodiment

Configuration of OFDM Demodulator

Figure 1:
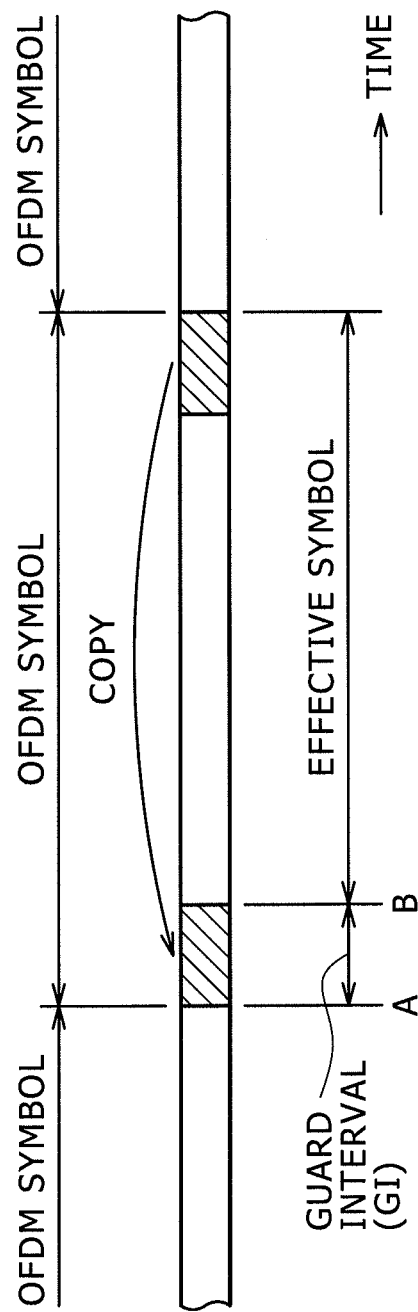
FIG. 1 is a diagram showing an OFDM symbol.
Figure 2:
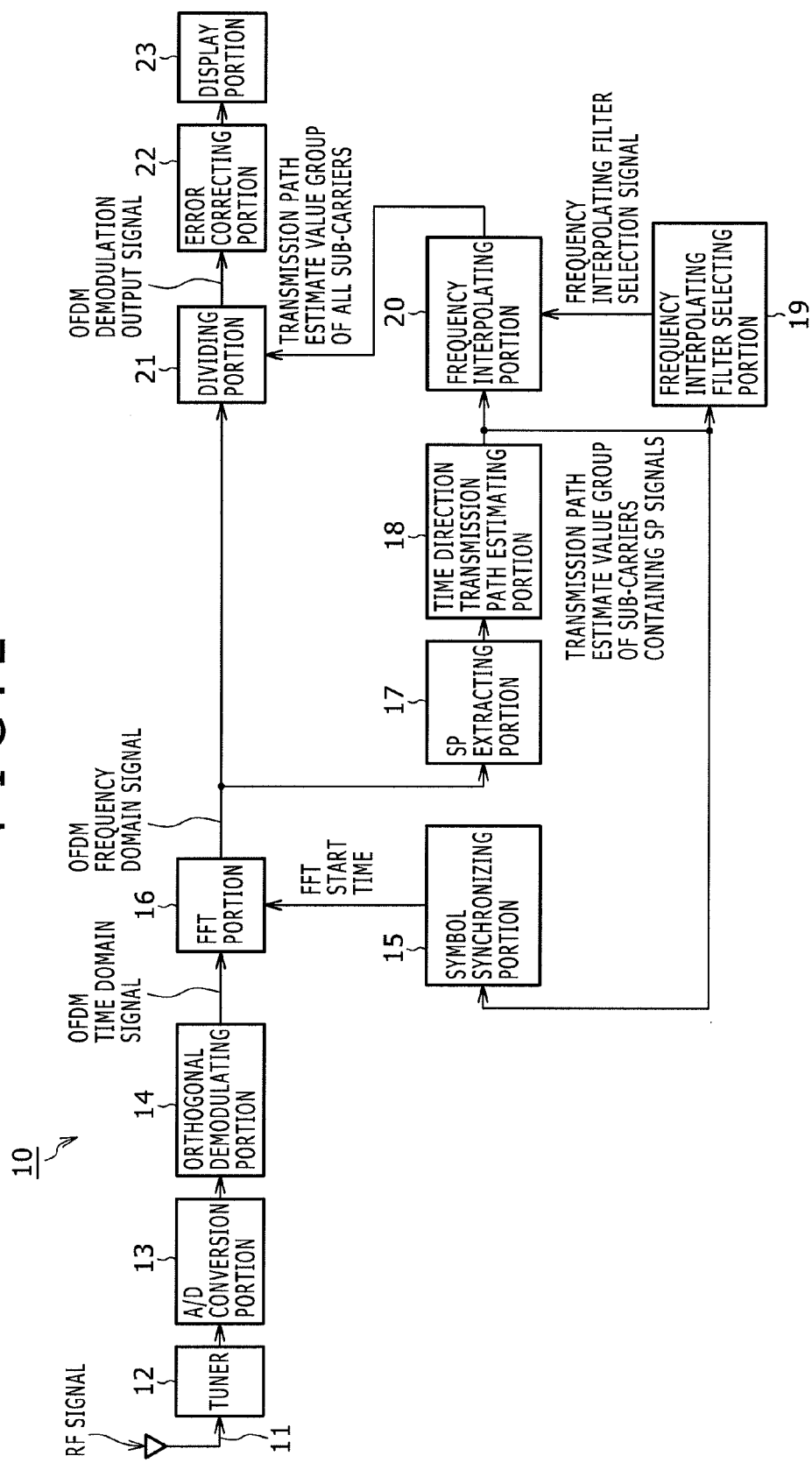
FIG. 2 is a block diagram showing a configuration of an OFDM demodulator according to a first embodiment of the present invention.

FIG. 2 is a block diagram showing a configuration of an OFDM demodulator as an information processor according to the first embodiment of the present invention.

The OFDM modulator 10 of the first embodiment is provided with an antenna 11, a tuner 12, an Analog-to Digital (A/D) converting portion 13, an orthogonal demodulating portion 14, a symbol synchronizing portion 15, and an FFT portion 16. Also, the OFDM modulator 10 is further provided with an SP extracting portion 17, a time direction transmission path estimating portion 18, a frequency interpolating filter selecting portion 19, a frequency interpolating portion 20, a dividing portion 21, an error correcting portion 22, and a display portion 23.

[Processing by OFDM Demodulator 10]

Figure 3:
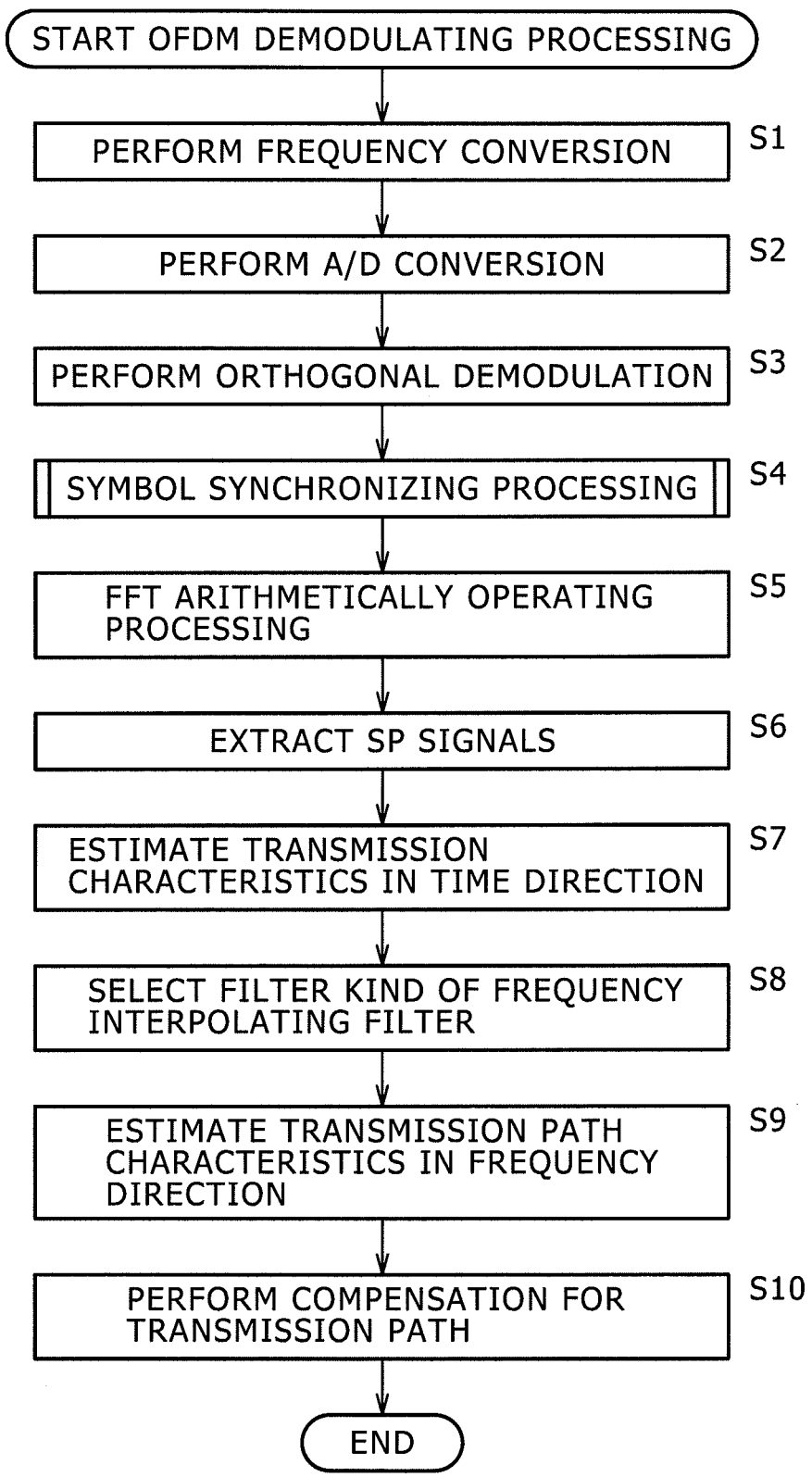
FIG. 3 is a flow chart explaining processing executed by the OFDM demodulator of the first embodiment shown in FIG. 2.

FIG. 3 is a flow chart explaining processing executed by the OFDM demodulator 10 (hereinafter referred to as "OFDM demodulating processing").

In Step S1, the tuner 12 frequency-converts an RF signal received at the antenna 11 into an IF signal, and supplies the resulting IF signal to the A/D conversion portion 13.

In Step S2, the A/D conversion portion 13 carries out A/D conversion for the IF signal supplied thereto, and supplies the resulting digitized IF signal to the orthogonal demodulating portion 14.

In Step S3, the orthogonal demodulating portion 14 orthogonal-modulates the digitized IF signal by using a carrier signal having a predetermined frequency (carrier frequency), and outputs an OFDM signal having a base band.

The OFDM signal having the base band outputted from the orthogonal demodulating portion 14 is a so-called OFDM time domain signal before being FFT-arithmetically operated. As a result of the orthogonal demodulation, the OFDM time domain signal becomes a complex signal containing therein a real-axis component (I channel signal) and an imaginary-axis component (Q channel signal). The OFDM time domain signal is then supplied to the FFT portion 16.

In Step S4, the symbol synchronizing portion 15 determines an FFT start time by using a transmission path estimate value group sent from the time direction transmission path estimating portion 18, and supplies data on the FFT start time to the FFT portion 16. Here, the FFT start time means a start time of an interval for which FFT processing is executed (hereinafter referred to as "an FFT interval"). As a result, the FFT interval is also determined. Such a series of processing executed by the symbol synchronizing portion 15 will be referred hereinafter to as "symbol synchronizing processing." Details of the symbol synchronizing portion 15 and the symbol synchronizing processing will be described later.

In Step S5, the FFT portion 16 executes FFT arithmetically operating processing for data, within a range of the FFT interval based on the FFT start time, of the OFDM time domain signal. The signal obtained by executing the FFT arithmetically operating processing is a so-called signal having a frequency region after completion of the execution of the FFT arithmetic operation. From this, hereinafter, the signal after the FFT arithmetic operation is carried out for the OFDM time domain signal will be referred to as "the OFDM frequency domain signal." That is to say, the OFDM frequency domain signal is outputted from the FFT portion 16 to be supplied to each of the SP extracting portion 17 and the dividing portion 21.

In Step S6, the SP extracting portion 17 extracts SP signals from the OFDM frequency domain signal, and removes modulated components of the SP signals. As a result, the transmission path characteristics in the positions of the SP signals are estimated, and the SP signals are supplied from the SP extracting portion 17 to the time direction transmission path estimating portion 18.

Here, the SP signal means a scattered pilot signal which is used to estimate the transmission path characteristics (frequency characteristics) on the OFDM receiver side.

In addition to a data carrier with which data is transmitted, the SP signals also exist as an OFDM symbol forming the OFDM transmission frame. That is to say, the SP signals are also allocated to respective sub-carriers.

Figure 4:
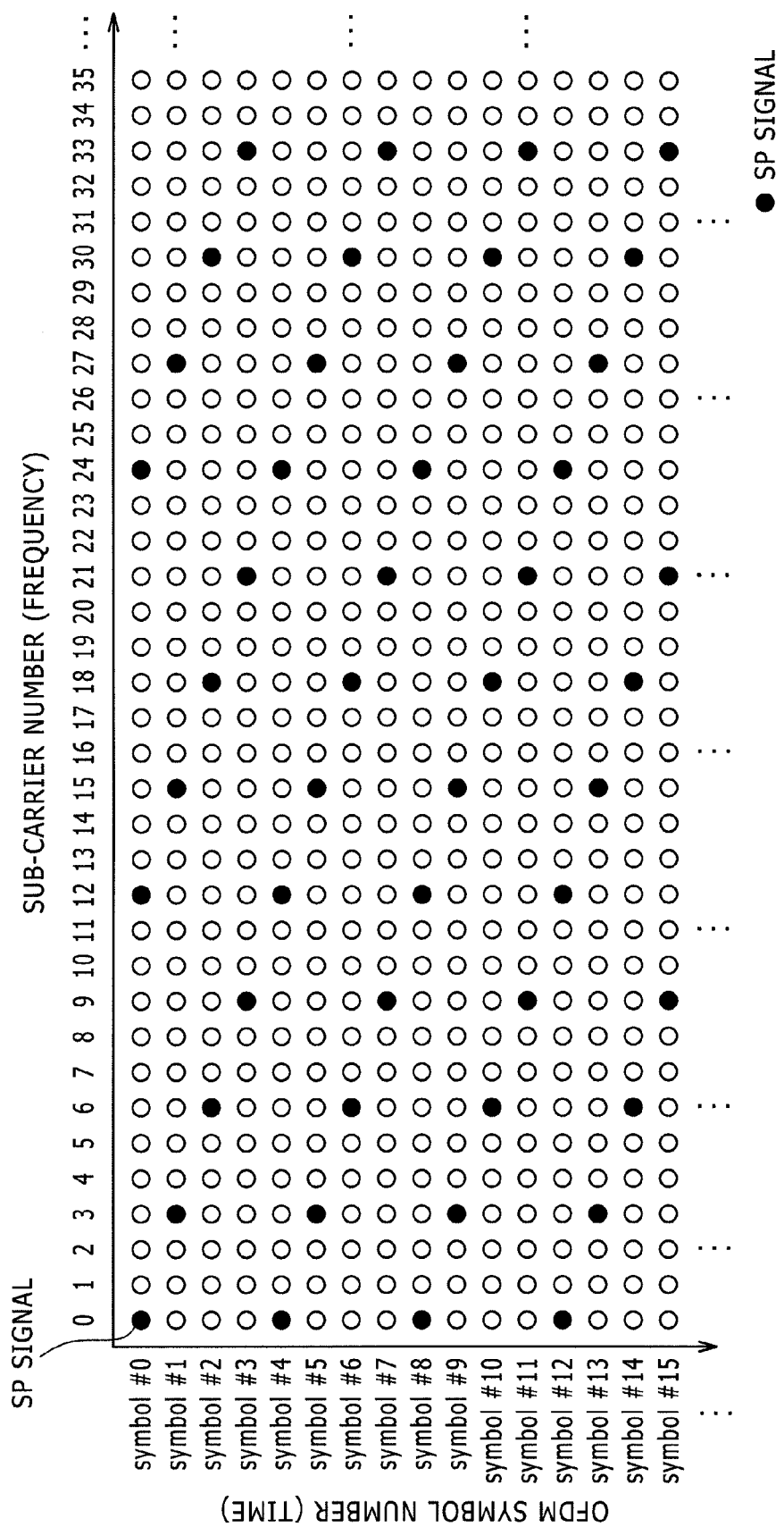
FIG. 4 is a diagram showing allocation of SP signals to sub-carriers.

FIG. 4 shows a diagram showing allocation of the SP signals to the respective sub-carriers. In FIG. 4, one circle symbol represents one OFDM symbol. An open circle symbol represents the data carrier as an object of the transmission. Also, a black circle symbol represents the SP signal.

The SP signal is a complex vector having known amplitude and phase. As shown in FIG. 4, the SP signal is disposed every three sub-carriers in the OFDM transmission frame. The data carriers each as the object of the transmission are disposed between each two SP signals. In the OFDM receiver, the SP signals are obtained in a state of being distorted by an influence of the transmission path characteristics. The transmission characteristics are acquired by comparing the SP signals in a phase of the reception, and the known SP signals in a phase of the transmission with each other.

Referring back to FIG. 3, in Step S7, the time direction transmission path estimating portion 18 estimates the transmission path characteristics in the time direction of the sub-carriers having the SP signals disposed therein every OFDM symbol based on the transmission path characteristics in the positions of the SP signals. As a result, for all the OFDM symbols, the transmission path characteristics for each three sub-carriers are estimated in the frequency direction, and data on the transmission path characteristics thus estimated is outputted from the time direction transmission path estimating portion 18.

It should be noted that the data outputted from the time direction transmission path estimating portion 18 is referred to as a transmission path estimate value group of the sub-carriers containing therein the SP signals. In addition, the transmission path estimate value group of the sub-carriers containing therein the SP signals is suitably abbreviated to a transmission path estimate value group. The transmission path estimate value group of the sub-carriers containing therein the SP signals is supplied to each of the symbol synchronizing portion 15, the frequency interpolating filter selecting portion 19, and the frequency interpolating portion 20.

In Step S8, the frequency interpolating filter selecting portion 19 selects a filter kind of a frequency interpolating filter used in the frequency interpolating portion 20 based on the transmission path estimate value group of the sub-carriers containing therein the SP signals. The frequency interpolating filter selecting portion 19 supplies a frequency interpolating filter selection signal representing the filter kind thus selected to the frequency interpolating portion 20.

In Step S9, the frequency interpolating portion 20 executes filter processing for the transmission path estimate value group of the sub-carriers containing therein the SP signals by using the frequency interpolating filter having the filter kind represented by the frequency interpolating filter selection signal, thereby estimating the transmission path characteristics in the frequency direction. As a result, the transmission path estimate value group of all the sub-carriers is obtained, and is then supplied from the frequency interpolating portion 20 to the dividing portion 21.

In Step S10, the dividing portion 21 divides the OFDM frequency domain signal for each sub-carrier sent from the FFT portion 16 by the transmission path estimate value of corresponding one of the sub-carriers. As a result, the compensation for the transmission path is carried out. The dividing portion 21 outputs the resulting OFDM frequency domain signal for each sub-carrier as a signal after completion of the OFDM demodulation to the circuit in the subsequent stage. It should be noted that the signal after completion of the OFDM demodulation thus outputted will be referred hereinafter to as "an OFDM demodulation output signal."

The OFDM demodulation output signal is supplied to the error correcting portion 22. The error correcting portion 22 executes de-interleaving processing for a signal interleaved on the transmission side. As a result, decoded data is obtained through depuncture, Viterbi decoding, diffusion signal removal, and Reed Solomon (RS) decoding, and is then outputted from the error correcting portion 22 to the display portion 23. The display portion 23 displays thereon an image corresponding to the decoded data.

Hereinafter, details of the symbol synchronizing portion 15 will be described with reference to FIG. 5 to FIGS. 10A to 10C.

[Configuration of Symbol Synchronizing Portion 15]

Figure 5:
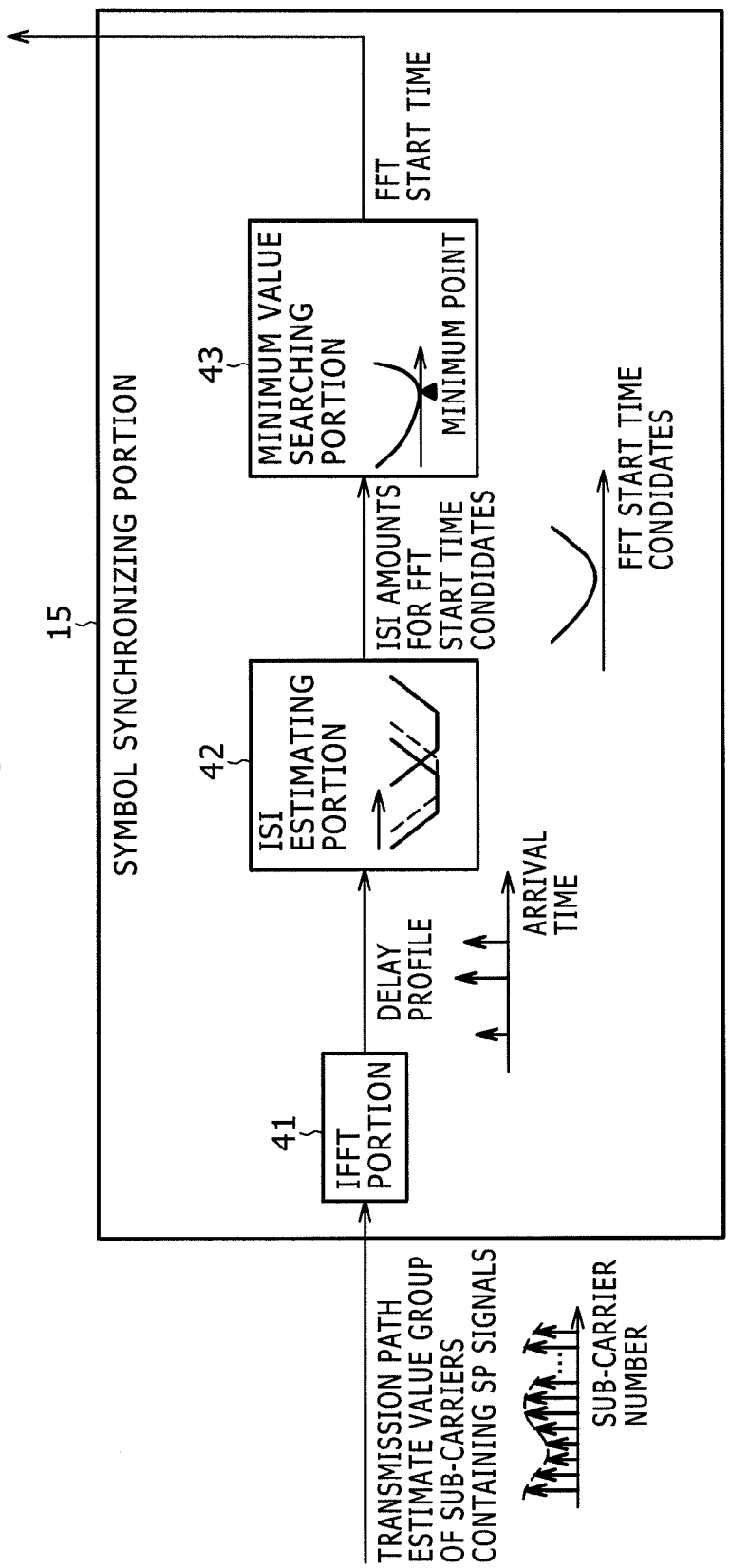
FIG. 5 is a block diagram showing a detailed configuration of a symbol synchronizing portion in the OFDM demodulator of the first embodiment shown in FIG. 2.

FIG. 5 is a block diagram showing a detailed configuration of the symbol synchronizing portion 15 shown in FIG. 15.

The symbol synchronizing portion 15 is composed of an IFFT portion 41, an ISI estimating portion 42, and a minimum value searching portion 43.

The IFFT portion 41 carries out inverse FFT conversion (hereinafter referred to as "IFFT processing") for the transmission path estimate value group, and supplies the resulting delay profile to the ISI estimating portion 42.

Here, the delay profile means an impulse response in a time zone of the transmission path extending from an apparatus (not shown) on the transmission side to the OFDM demodulator 10.

It is noted that an arrow indicated in a lower side of the wording "TRANSMISSION PATH ESTIMATE VALUE GROUP OF SUB-CARRIERS CONTAINING SP SIGNALS" in FIG. 5 represents one transmission path estimate value. As apparent from this, the transmission path estimate values are given to the sub-carrier numbers, respectively. However, of course, the transmission path estimate value group of the sub-carriers containing therein the SP signals does not contain therein the transmission path estimate values about the sub-carriers other than the sub-carriers containing therein the SP signals. Therefore, it should be noted that the transmission path estimate values about the sub-carrier numbers of the sub-carriers other than the sub-carriers containing therein the SP signals each become zero.

The ISI estimating portion 42 sets candidates at an FFI start time (hereinafter referred to as "FFT start time candidates") in order, and estimates amounts of ISIs for the FFT start time candidates in order. After completion of the estimation of the ISI amounts for all the FFT start time candidates, the ISI estimating portion 42 supplies each of the ISI amounts for all the FFT start time candidates to the minimum value searching portion 43.

That is to say, for example, the ISI estimating portion 42 disposes a predetermined filter in each of filter positions corresponding to the FFT start time candidates, respectively. For example, the ISI estimating portion 42 disposes a filter having a filter shape illustrated in a block of the ISI estimating portion 42 shown in FIG. 5. This filter will be referred hereinafter to as "an ISI estimating filter." It is noted that the details of the ISI estimating filter will be described later with reference to FIG. 7, etc. The ISI estimating portion 42 executes the filter processing for the delay profile after completion of the execution of the IFFT processing by using the ISI estimating filter, thereby estimating the ISI amounts for the FFT start time candidates, respectively. As a result, the ISI amounts for the FFI interval candidates are respectively estimated.

The minimum value searching portion 43 searches for the FFT start time candidate having the minimum ISI amount from among all the FFT start time candidates, and outputs the FFT start time candidate having the minimum ISI amount thus searched for as the FFT start time. That is to say, for example, the minimum value searching portion 43 searches for the FFT start time candidate indicated by a black triangular mark ▲ described as a minimum point illustrated in a block of the minimum value searching portion 43 shown in FIG. 5, and outputs the FFT start time candidate indicated by the black triangular mark ▲ as the FFT start time. As a result, the FFT interval is also determined.

[Estimation of ISI Amount Using Delay Profiles]

FIGS. 6A and 6B are respectively a diagram and a time-line chart explaining the estimation of the ISI amounts using the delay profiles.

FIG. 6A is a diagram showing a structure of the OFDM time domain signal under the multi-path environment. Also, FIG. 6B is a time-line chart showing the delay profiles.

In FIGS. 6A and 6B, a horizontal right-hand direction shows a time direction, and times represent arrival times of the OFDM time domain signal, respectively.

In FIG. 6A, there exist three paths p1 to p3 each containing therein a direct wave of the OFDM time domain signal.

Vertical widths, in FIG. 6A, of the paths p1 to p3 are widths equivalent to powers of the paths p1 to p3 (hereinafter referred to as "path powers"), respectively.

In FIG. 6B, delay profiles pp1 to pp3 of the paths p1 to p3 are represented in the form of arrows, respectively. The arrival times of the delay profiles pp1 to pp3 represent times between the effective symbols YS and the GI of the paths p1 to p3, respectively. In addition, lengths of the arrows of the delay profiles pp1 to pp3 are lengths equivalent to the path powers of the paths p1 to p3. It is noted that the lengths (path powers) of the arrows of the delay profiles pp1 to pp3 will be represented hereinafter as "P1 to P3," respectively.

It is noted that in FIG. 6A, the OFDM symbols right before the OFDM symbols each as an object of the processing of the FFT arithmetic operation (the OFDM symbols which are designated by reference symbols GI and YS in the figure) will be referred hereinafter to as "the pre-OFDM symbols MS," respectively. In addition, the OFDM symbols next to the OFDM symbols each as the object of the processing of the FFT arithmetic operation will be referred hereinafter to as "the next OFDM symbols TS," respectively. Note that, these premises also apply to the following description.

The ISI amount is obtained in the form of a sum of products of the lengths of the intervals which are eroded by the ISIs of the paths (hereinafter referred to as "ISI erosion intervals") and the path powers with respect to all the paths.

Now, it is assumed that the FFT interval candidates as shown in FIG. 6B are set.

In this case, when a consideration is made with the path p1 as a reference, the ISI with the path p2 occurs in a portion (a portion designated by a reference symbol ISI in FIG. 6A) of the FFT interval candidate in the OFDM symbol other than the OFDM symbols each as the object of the processing of the FFT arithmetic operation for the path p2. A length of this portion in the time direction will be referred hereinafter to as "the ISI erosion interval dt2." In addition, the ISI with the path p3 occurs in a portion (a portion designated with reference symbol ISI in FIG. 6A) of the FFT interval candidate in the OFDM symbol other than the OFDM symbols each as the object of the processing of the FFT arithmetic operation for the path p3. A length of this portion in the time direction will be referred hereinafter to as "the ISI erosion interval dt3"). In this case, the ISI amount is estimated to be (dt2×P2+dt3×P3).

It is noted that in FIG. 6A, the ISI with the path p2, and the ISI with the path p3 each occur in the pre-OFDM symbols MS. However, it should be noted that the ISI may also occur in the next OFDM symbol TS depending on the FFT interval candidates.

The arithmetic operation for estimating the ISI amount described above can be realized by executing the filter processing for the delay profile by using the ISI estimating filter.

[Filter Shape of ISI Estimating Filter]

Figure 7:
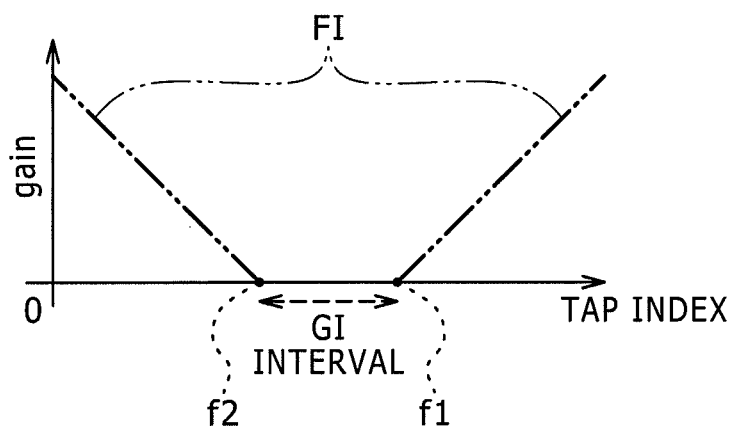
FIG. 7 is a graphical representation showing a filter shape of an ISI estimating filter.

FIG. 7 is a graphical representation showing a filter shape of the ISI estimating filter.

In FIG. 7, an axis of ordinate represents a filter coefficient in the form of a gain, and an axis of abscissa represents a tap index. Note that, this also applied to any of subsequent graphical representations showing filter shapes of the ISI estimating filters.

The ISI estimating filter FI shown in FIG. 7 has such a shape that the filter coefficient becomes zero in the interval of the tap index corresponding to an interval of the length of the GI (hereinafter referred to as "a GI interval"). It is noted that a temporal back end of the GI interval (a right-hand end of the GI interval in the figure) will be referred hereinafter to as "a back end f1." Also, a temporal front end of the GI interval (a left-hand end of the GI interval in the figure) will be referred hereinafter to as "a front end f2." Moreover, the ISI estimating filter FI has such a shape that for a temporal back interval relative to the back end f1, the filter coefficient increases in proportion to a distance from the back end f1 (hereinafter referred to as "a back end distance"). That is to say, the ISI estimating filter FI has the shape of a linear line with a gradient $\alpha 1$ ($\alpha 1 > 0$) for the temporal back interval relative to the back end f1. It is noted that the gradient $\alpha 1$ represents an increase rate of the filter coefficient with respect to the back end distance. Although the gradient α1 may have an arbitrary value, the gradient α1 is assumed to be 1 in the first embodiment. In addition, the ISI estimating filter FI also has such a shape that for a temporal prior interval relative to the front end f2, the filter coefficient increases in proportion to a distance from the front end f2 (hereinafter referred to as "a front end distance"). That is to say, the ISI estimating filter FI has the shape of a linear line with a gradient α2 (α2<0) for the temporal prior interval relative to the front end f2. It is noted that the gradient α2 represents an increase rate of the filter coefficient with respect to the front end distance. Although the gradient α2 may have an arbitrary value, the gradient α2 is assumed to be −1 in the first embodiment.

However, the filter shape of the ISI estimating filter FI shown in FIG. 7 is merely an example of the filter shape of the ISI estimating filter FI. The ISI estimating filter FI is enough as long as the ISI estimating filter FI has a downward projecting shape.

[Principle of Estimating ISI Amount by Filter Processing]

Next, a description will be given with respect to the principle of estimating the ISI amount by executing the filter processing using the ISI estimating filter FI.

Figure 8:
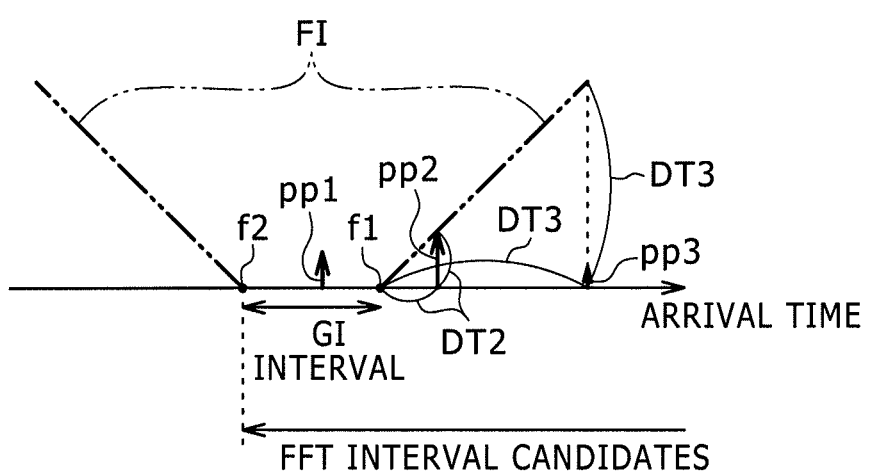
FIG. 8 is a graphical representation showing a state in which a delay profile and the filter shape of the ISI estimating filter are put on top of each other.

FIG. 8 is a graphical representation showing a state in which the delay profile and the filter shape of the ISI estimating filter FI are put on top of each other.

In FIG. 8, an axis of abscissa represents the arrival time. Also, an axis of ordinate (not shown) represents the path power with respect to the delay profile, and represents the filter coefficient with respect to the ISI estimating filter FI. It is noted that this also applies to any of subsequent figures each showing a state in which the delay profile and the shape of the ISI estimating filter are put on top of each other.

It is noted that the delay profiles pp1 to pp3 shown in FIG. 8 are identical to the delay profiles pp1 to pp3 shown in FIG. 6B, respectively. In addition, the ISI estimating filter FI shown in FIG. 8 is identical to the ISI estimating filter FI shown in FIG. 7.

As shown in FIG. 8, the ISI estimating filter FI is disposed so that the front end f2 agrees with the temporal front end of the FFT interval candidate (FFT start time candidate) (Therefore, the arrival time at the front end f2 is used as the FFT start time candidate). Referring to FIG. 8, although the delay profile pp1 lies within the GI interval, the delay profiles pp2 and pp3 exist in the arrival times each of which lies temporarily posterior to the back end f1. Now, the back end distances of the delay profiles pp2 and pp3 are set as DT2 and DT3, respectively. In this case, the filer coefficient applied to the delay profile pp1 is zero. The filer coefficient applied to the delay profile pp2 becomes the back end distance DT2 of the delay profile pp2. Also, the filer coefficient applied to the delay profile pp3 becomes the back end distance DT3 of the delay profile pp3.

The ISI estimating portion 42 executes the filter processing for all the data after completion of the execution of the IFFT processing by using the ISI estimating filter FI. As a result, all the data after completion of the execution of the IFFT processing is substituted to Expression (1) to be arithmetically operated. As a result, the ISI amount is estimated:

$$ISI\ amount = \sum_{n=0}^{NN-1} (path\ power \times filter\ coefficient) \quad (1)$$

where NN represents the number of data points (the number of IFFT points) of all the data after completion of the execution of the IFFT processing.

In FIG. 8, of all the data after completion of the execution of the IFFT processing, the data having values each not zero as (the path power×the filter coefficient) is as follows. That is to say, such data is only (P2×DT2) in the data point corresponding to the delay profile pp2, and (P3×DT3) in the data point corresponding to the delay profile pp3. Therefore, all the data after completion of the execution of the IFFT processing is substituted to Expression (1) to be arithmetically operated, and as a result, a processing result of (P2×DT2+P3×DT3) is acquired. It is noted that the back end distance DT2 is equal to the ISI erosion interval dt2 previously stated. Also, the back end distance DT3 is equal to the ISI erosion interval dt3 previously stated. Therefore, this processing result agrees with (P2×dt2+P3×dt3), that is, the ISI amount previously stated.

The ISI amount can be estimated in such a manner by executing the filter processing using the ISI estimating filter FI. In the subsequent description, basically, the technique for estimating the ISI amount is adopted.

[Processing by ISI Estimating Portion 42]

FIGS. 9A to 9F are respectively graphical representations explaining the processing executed by the ISI estimating operation 42 shown in FIG. 5.

FIGS. 9A, 9C and 9E are respectively graphical representations each showing a state in which the delay profile and the filter shape of the ISI estimating filter FI are on top of each other. Also, FIGS. 9B, 9D and 9F are respectively graphical representations showing the ISI amounts for the FFT start time candidates.

In each of FIGS. 9B, 9D and 9F, an axis of abscissa represents the FFT start time candidate, and an axis of ordinate (not shown) represents the ISI amount. Note that, this also applies to any of the subsequent figures each showing the ISI amount with respect to the FFT start time candidate.

Figure 6:
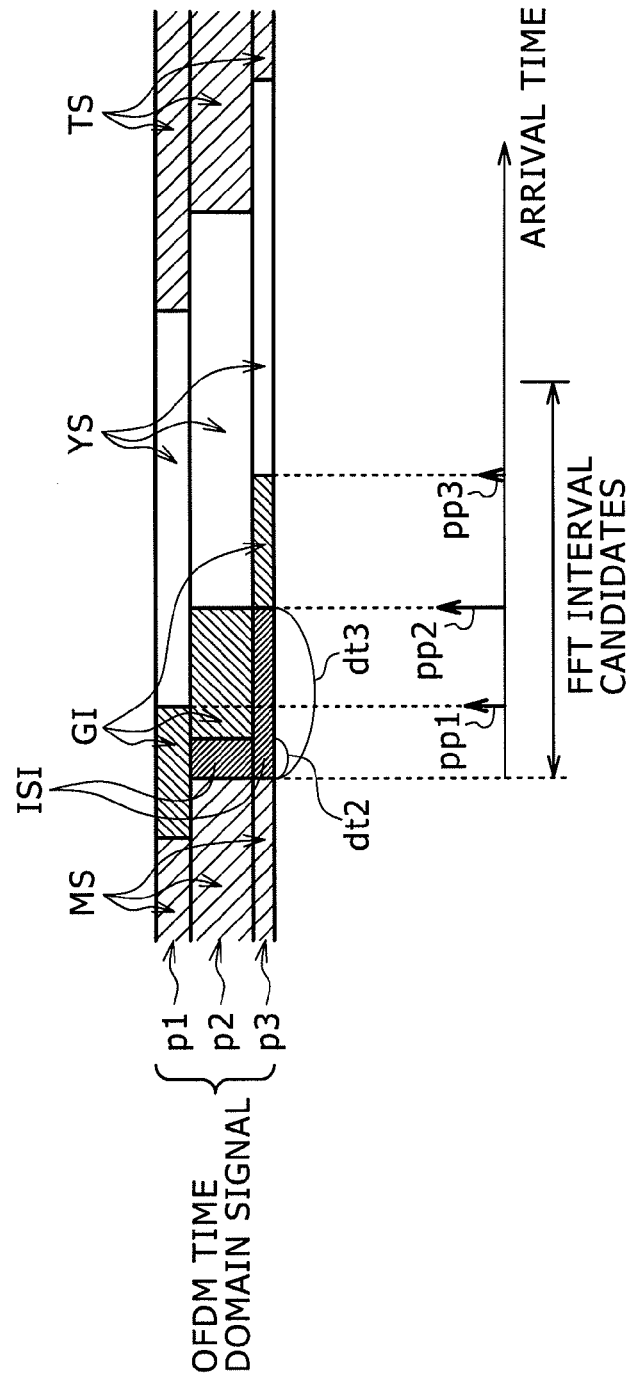
FIGS. 6A and 6B are respectively a diagram and a time-line chart explaining estimation of ISI amounts using delay profiles.

The delay profiles pp1 to pp3 of each of FIGS. 9A, 9C and 9E are identical to the delay profiles pp1 to pp3 shown in FIG. 6, respectively. In addition, the ISI estimating filter FI of each of FIGS. 9A, 9C and 9E is identical to the ISI estimating filter FI shown in FIG. 7.

It is noted that in each of FIGS. 9A to 9F, the number of filter portions of the ISI estimating filters is N. In addition, the ISI estimating filters are swept from the filter position where the arrival time is earlier in order. It is noted that an x-th filter position from the filter position where the arrival time is earlier will be referred hereinafter to as an x (1≦x≦N)-th filter position.

When the sweeping is started, when the FFT start time candidate is t1 (when the FFT start time candidate corresponding to the first filter position), for example, in FIGS. 9A and 9B, only the delay profile pp1 of the delay profiles pp1 to pp3 is contained in the GI interval.

The ISI estimating portion 42 executes the filter processing using the ISI estimating filter FI for all the data after completion of the execution of the IFFT processing. As a result, all the data after completion of the execution of the IFFT processing is substituted to Expression (1) to be arithmetically operated. As a result, the ISI amount is estimated.

Referring to FIG. 9A, of all the data after completion of the execution of the IFFT processing, only the delay profiles pp1 to pp3 have values other than zeros as the path powers. The delay profile pp1 of the delay profiles pp1 to pp3 lies within the GI interval. The delay profiles pp2 and pp3 each lie temporarily posterior to the back end f1. The back end distances of the delay profiles pp2 and pp3 are DT2a and DT3a, respectively. Therefore, the filter coefficients applied to the delay profiles pp1, pp2 and pp3 are 0, DT2a and DT3a, respectively. Of all the data after completion of the execution of the IFFT processing, the data having the values other than zeros as (the path power×the filter coefficient) is as follows. That is to say, such data is (P2×DT2a) in the data point corresponding to the delay profile pp2, and (P3×DT3a) in the data point corresponding to the delay profile pp3. Therefore, all the data after completion of the execution of the FFT processing is substituted to Expression (1) to be arithmetically operated, and as a result, the processing result of (P2×DT2a+P3×DT3a) is acquired. As a result, the ISI amount D1 for the FFT start time candidate t1 is estimated to be (pp2×DT2a+pp3×DT3a). The ISI amount D1 thus estimated is shown in FIG. 9B.

Also, the ISI estimating portion 42 re-disposes the ISI estimating filter FI in the second filter position which is later (in the right-hand direction in the figure) from the current first filter position.

Likewise, the ISI amounts at and after the FFT start time candidate t2 are estimated.

That is to say, at the time of the FFT start time candidate tk ($2 \leq k \leq N-1$) (at the time of the k-th filter position), for example, in FIGS. 9C and 9D, the delay profiles pp1 and pp2 of the delay profiles pp1 to pp3 lie within the GI interval.

The ISI estimating portion 42 executes the filter processing using the ISI estimating filter FI for all the data after completion of the execution of the IFFT processing. As a result, all the data after completion of the execution of the IFFT processing is substituted to Expression (1) to be arithmetically operated. As a result, the ISI amount is estimated.

Referring to FIG. 9C, of all the data after completion of the execution of the IFFT processing, only the delay profiles pp1 to pp3 have values other than zero as the path power. The delay profiles pp1 and pp2 of the delay profiles pp1 to pp3 each lie within the GI interval. The delay profile pp3 lies temporarily posterior to the back end f1. The back end distance of the delay profile pp3 is DT3b. Therefore, the filter coefficients applied to the delay profiles pp1, pp2 and pp3 are 0, 0 and DT3b, respectively. Therefore, of all the data after completion of the execution of the IFFT processing, the data having the value other than zero as (the path power×the filter coefficient) is (P3×DT3b) in the data point corresponding to the delay profile pp3. Therefore, all the data after completion of the execution of the FFT processing is substituted to Expression (1) to be arithmetically operated, and as a result, the processing result of (P3×DT3b) is acquired. As a result, the ISI amount Dk for the FFT start time candidate tk is estimated to be (pp3×DT3b). The ISI amount Dk thus estimated is shown in FIG. 9D.

Also, the ISI estimating portion 42 re-disposes the ISI estimating filter FI in the (k+1)-th filter position which is later from the current k-th filter position by a predetermined time.

At the time of the FFT start time candidate tk, not only the delay profile pp1, but also the delay profile pp2 lies within the GI interval. The back end distance DT3b of the remaining profile pp3 is shorter than the back end distance DT3a at the time of the FFT start time candidate t1. Therefore, the ISI amount Dk at the FFT start time candidate tk is less than the ISI amount D1 at the FFT start time candidate t1.

Likewise, the ISI amounts at and after the FFT start time candidate t(k+1) are estimated.

At the time of the FFT start time candidate tN (at the time of the N-th filter position), for example, in FIGS. 9E and 9F, only the delay profile pp3 of the delay profiles pp1 to pp3 is contained in the GI interval.

The ISI estimating portion 42 executes the filter processing using the ISI estimating filter FI for all the data after completion of the execution of the FFT processing. As a result, all the data after completion of the execution of the IFFT processing is substituted to Expression (1) to be arithmetically operated. As a result, the ISI amount is estimated.

Referring to FIG. 9C, of all the data after completion of the execution of the IFFT processing, only the delay profiles pp1 to pp3 have values other than zero as the path power. The delay profile pp3 of the delay profiles pp1 to pp3 lies within the GI interval. The delay profiles pp1 and pp2 each lie temporarily posterior to the front end f2. The front end distances of the delay profiles pp1 and pp2 are DT1c and DT2c, respectively. Therefore, the filter coefficients applied to the delay profiles pp1, pp2 and pp3 are DT1c, DT2c and 0, respectively. Therefore, of all the data after completion of the execution of the IFFT processing, the data having the values other than zero as (the path power×the filter coefficient) is as follows. That is to say, such data is (P1×DT1c) in the data point corresponding to the delay profile pp1, and (P2×DT2c) in the data point corresponding to the delay profile pp2. Therefore, all the data after completion of the execution of the FFT processing is substituted to Expression (1) to be arithmetically operated, and as a result, the processing result of (P1×DT1c+P2×DT2c) is acquired. As a result, the ISI amount DN for the FFT start time candidate tN is estimated to be (P1×DT1c+P2×DT2c). The ISI amount DN thus estimated is shown in FIG. 9F.

At the time of the FFT start time candidate tN, only the delay profile pp3 having the small path power is contained in the GI interval. Therefore, the ISI amount DN at the FFT start time candidate tN is more than the ISI amount Dk at the FFT start time candidate tk.

The ISI amounts for all the FFT start time candidates t1 to tN are respectively estimated in the manner as described above. As a result, as shown in FIG. 9F, each of the ISI amounts for all the FFT start time candidates changes so as to have the downward projecting shape. As a result, as will be described below, it is possible to search for the FFT start time candidate having the minimum ISI amount.

[Search Result by Minimum Value Searching Portion 43]

Figure 10A:
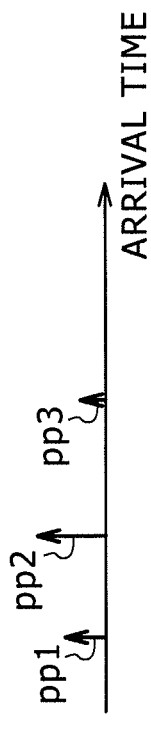
FIGS. 10A, 10B and 10C are respectively a time-line chart, a graphical representation, and a diagram explaining results of searching for an FFT start time candidate by a minimum value searching portion shown in FIG. 5.
Figure 10B:
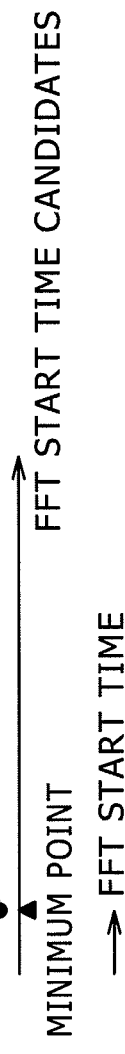
Figure 10C:
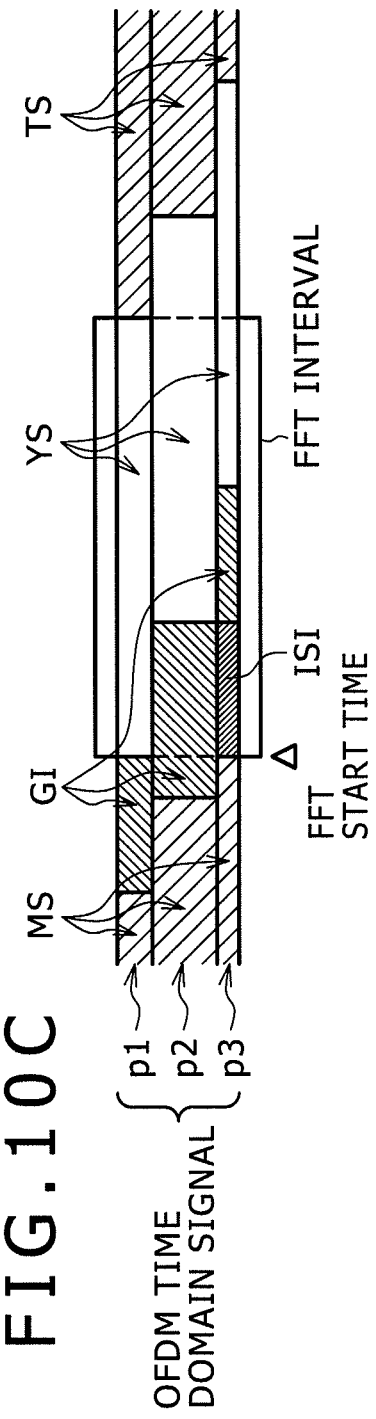

FIGS. 10A to 10C are respectively a time-line chart, a graphical representation, and a diagram explaining a result of searching for the FFT start time candidate made by the minimum value searching portion 43 shown in FIG. 5.

FIG. 10A is a time-line chart showing the delay profile. FIG. 10B is a graphical representation showing the ISI amount with respect to the FFT start time candidate. Also, FIG. 10C is a diagram showing a structure of the OFDM time domain signal.

The delay profiles pp1 to pp3 shown in FIG. 10A are identical to the delay profiles pp1 to pp3 shown in FIG. 6, respectively. In addition, the ISI amounts for the FFT start time candidates shown in FIG. 10B are identical to the ISI amounts for the FFT start time candidates shown in FIG. 9F, respectively.

Referring to FIG. 10B, the minimum ISI amount of all the ISI amounts is the ISI amount Dk. Therefore, the FFT start time candidate when the ISI amount Dk is obtained (the FFT start time candidate tk) is searched for as the FFT start time.

As shown in FIG. 10C, that FFT start time agrees with a boundary between the GI of the path p1, and the effective symbol YS. In this case, it is understood that only the path p3 having the least path power is affected by the ISI, and the ISI amount becomes undoubtedly minimum.

[Processing by Symbol Synchronizing Portion 15]

Figure 11:
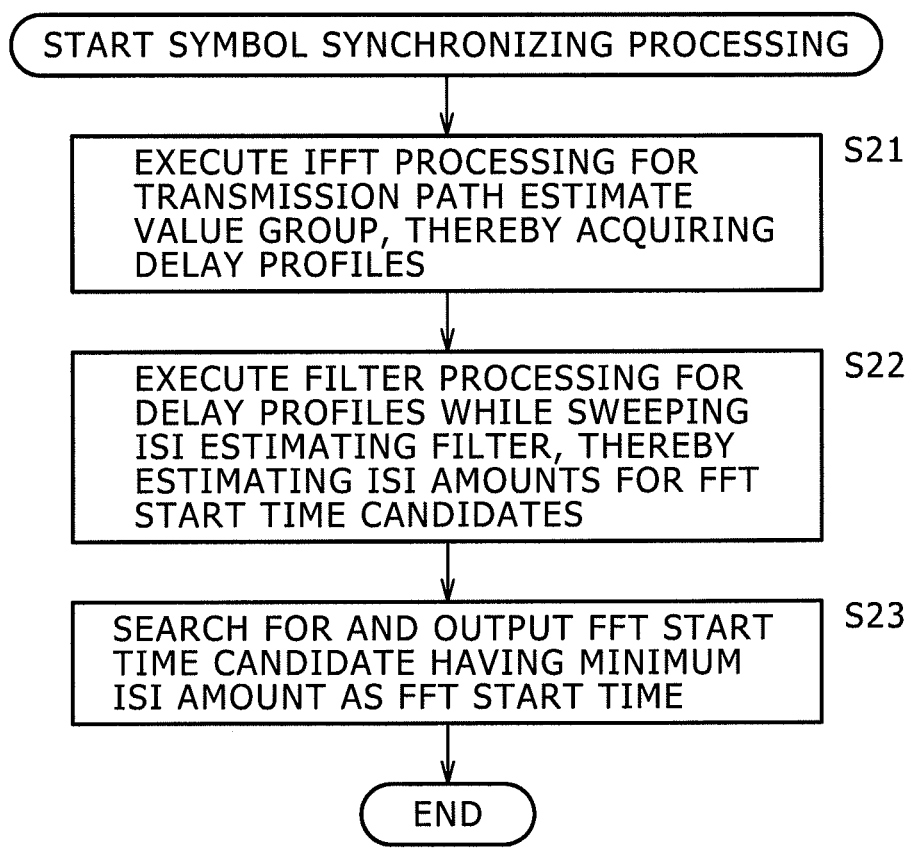
FIG. 11 is a flow chart explaining processing executed by a symbol synchronizing portion shown in FIG. 5.

FIG. 11 is a flow chart explaining processing executed by the symbol synchronizing portion 15 shown in FIG. 5 (the symbol synchronizing processing in Step S4 shown in FIG. 3).

In Step S21, the IFFT portion 41 of the symbol synchronizing portion 15 executes the IFFT processing for the transmission path estimate value group, thereby acquiring the delay profile.

In Step S22, the ISI estimating portion 42 executes the filter processing for the delay profile while the sweeping the ISI estimating filter, thereby estimating the ISI amounts for the FFT start time candidates.

In Step S23, the minimum value searching portion 43 searches for the FFT start time candidate having the minimum ISI amount as the FFT start time, and outputs data on the FFT start time candidate having the minimum ISI amount.

2. Second Embodiment

Next, an OFDM modulator according to a second embodiment of the present invention will be described in detail.

With the OFDM modulator of the second embodiment, the delay profiles are corrected for the purpose of obtaining the proper delay profiles.

Note that, for the purpose of facilitating the understanding of the OFDM demodulator of the second embodiment, a description will now be given with respect to the correction purpose of obtaining the proper delay profiles.

As previously stated, in the ISDB-T standard, the SP signals are disposed in one in every three sub-carriers. Therefore, when the IFFT processing is executed for the transmission path estimate value group containing therein the SP signals, a phantom delay profile caused by aliasing for each ⅓ of the effective symbol Tu (Tu/3) appears. In other words, even for the same transmission path estimate value group of the sub-carriers containing therein the SP signals, the two cases, i.e., the case of a pre-echo and the case of a post-echo which will be described below are possible.

[Pre-Echo and Post-Echo]

FIGS. 12A and 12D, FIGS. 12B and 12E, and FIGS. 12C and 12F are respectively diagrams, time-line charts, and graphical representations explaining the pre-echo and the post-echo.

FIG. 12A is a diagram showing a structure of the OFDM time domain signal in the case of the pre-echo. FIG. 12B is a time-line chart showing the delay profiles in the case of the pre-echo. FIG. 12C is a graphical representation showing the transmission path estimate value group in the case of the pre-echo. Also, FIG. 12D is a diagram showing a structure of the OFDM time domain signal in the case of the post-echo. FIG. 12E is a time-line chart showing the delay profiles in the case of the post-echo. FIG. 12F is a graphical representation showing the transmission path estimate value group in the case of the post-echo.

Referring to FIG. 12A, the OFDM time domain signal is composed of the path p1 and the path p2. When the path p2 is set as a reference, the path p1 precedes the path p2 set as the reference. The pre-echo means such a preceding path. In this case, as shown in FIG. 12B, the delay profile pp1 of the path p1 also lies temporarily anterior to the delay profile pp2 of the path p2 set as the reference. FIG. 12C shows the transmission path estimate value group before completion of the execution of the IFFT processing corresponding to these delay profiles pp1 and pp2.

Referring to FIG. 12D, the OFDM time domain signal is composed of the path p2 and the path p3. Here, the path p2 is identical to the path p2 shown in FIG. 12A. When the path p2 is set as a reference, the path p3 is delayed with respect to the path p2 set as the reference. The post-echo means such a delayed path. In this case, as shown in FIG. 12E, the delay profile pp3 of the path p3 also lies temporarily posterior to the delay profile pp2 of the path p2 set as the reference. FIG. 12F shows the transmission path estimate value group before completion of the execution of the IFFT processing corresponding to these delay profiles pp1 and pp3.

The transmission path estimate value group shown in FIG. 12F agrees with the transmission path estimate value group shown in FIG. 12C. Therefore, it may be impossible to identify the pre-echo and the post-echo only from the delay profiles obtained by executing the IFFT processing for the transmission path estimate value group.

For the symbol synchronizing portion 15, it is required that the pre-echo and the post-echo are identified, thereby obtaining the proper delay profiles (hereinafter referred to as "the true delay profiles").

Then, in each of the embodiments in and after the second embodiment, the delay profiles obtained through the IFFT processing are corrected into the true delay profiles. When this correction is carried out, the delay profiles need to be rotated with a certain position becoming a reference as a center. The position becoming the reference will be referred hereinafter to as "the reference position." It should be noted that the rotation of the delay profiles will be described later.

As has been described, the purpose of correcting the delay profiles is to obtain the true delay profiles.

[Configuration of OFDM Demodulator]

Figure 13:
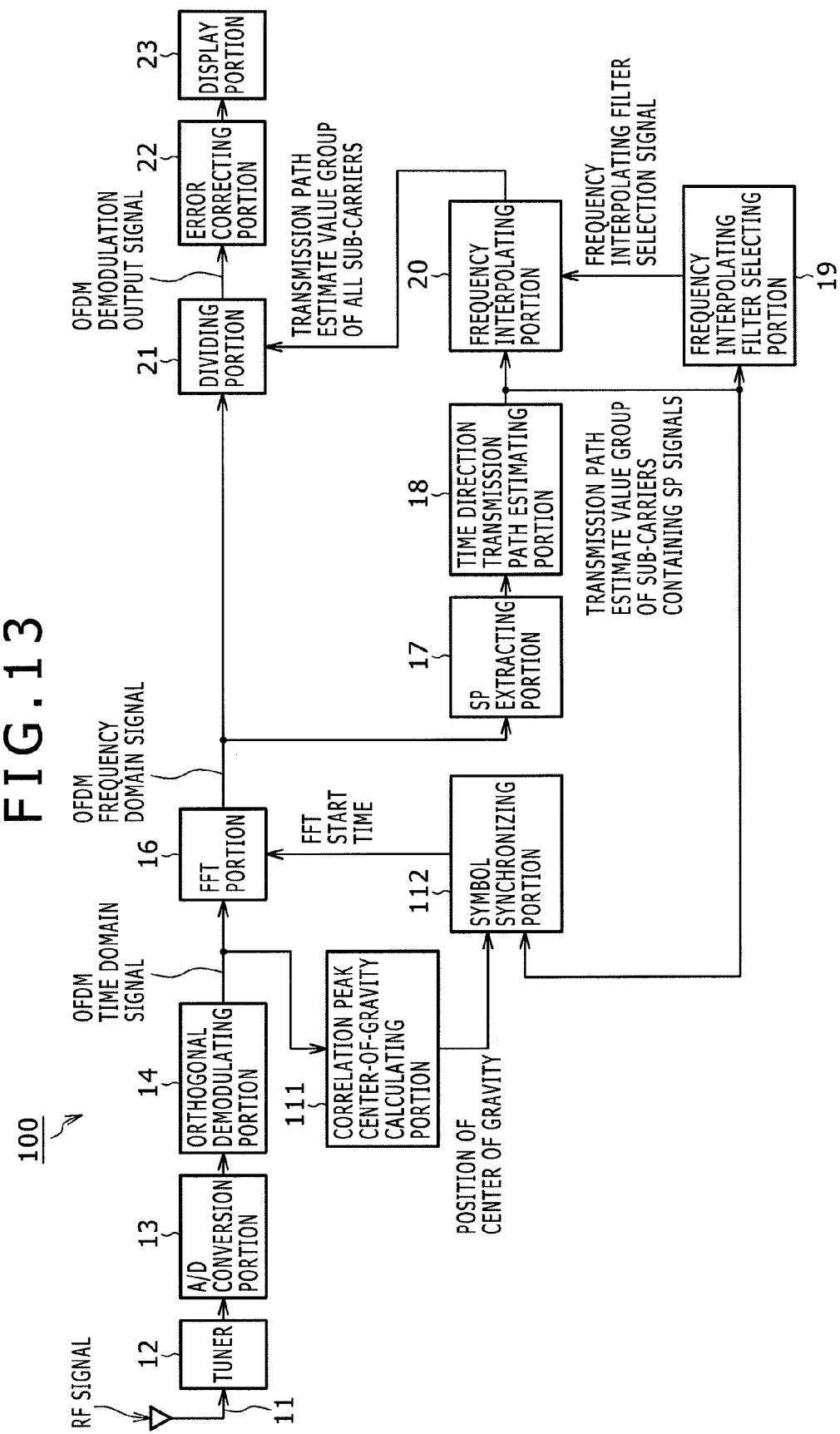
FIG. 13 is a block diagram showing a configuration of an OFDM demodulator according to a second embodiment of the present invention.

FIG. 13 is a block diagram showing a configuration of an OFDM demodulator according to the second embodiment of the present invention.

It is noted that in FIG. 13, portions corresponding to those in FIG. 2 are designated by the same reference numerals, respectively, and a description thereof is suitably omitted here for the sake of simplicity.

The OFDM demodulator 100 shown in FIG. 13 has basically the same configuration as that of the OFDM demodulator 10 shown in FIG. 2. However, a correlation peak center-of-gravity calculating portion 111 is added as a block for obtaining a position of a center of gravity which will be described as the reference position later to the OFDM demodulator 100 shown in FIG. 13. In addition, in the OFDM demodulator 100 shown in FIG. 13, a symbol synchronizing portion 112 is provided as a block for determining the FFT interval based on the position of the center of gravity instead of providing the symbol synchronizing portion 15 in the OFDM demodulator 10 shown in FIG. 2.

That is to say, the OFDM demodulator 100 is provided with the antenna 11, the tuner 12, the A/D conversion portion 13, the orthogonal demodulating portion 14, the FFT portion 16, the SP extracting portion 17, and the time direction transmission path estimating portion 18. Also, the OFDM demodulator 100 is further provided with the frequency interpolating filter selecting portion 19, the frequency interpolating portion 20, the dividing portion 21, the error correcting portion 22, the display portion 23, the correlation peak center-of-gravity calculating portion 111, and the symbol synchronizing portion 112.

The correlation peak center-of-gravity calculating portion 111 executes correlation processing for delaying the OFDM time domain signal sent from the orthogonal demodulating portion 14 by the effective symbol length Tu, and obtaining a correlation between the OFDM time domain signal after completion of the delay, and the OFDM time domain signal not delayed. As a result, a correlation value group is obtained.

The correlation peak center-of-gravity calculating portion 111 executes moving average processing for the correlation value group thus obtained. Each of correlation values of the resulting correlation value group can be regarded as the simple delay profile. The correlation peak center-of-gravity calculating portion 111 obtains positions of the centers of gravity about all the simple delay profiles (hereinafter suitably referred to as "the positions of the centers of gravity") by using Expression (2):

Positions of centers of gravity=[Σ(path power×arrival time)]/[Σ(path power)]   (2)

where Σ means integration of all the data points of the correlation value group for which the moving average processing is executed, and the path power means a path power corresponding to the simple delay profile. Therefore, the path power can be obtained in the form of a length of the simple delay profile. Also, the correlation peak center-of-gravity calculating portion 111 supplies the data on the positions of the centers of gravity thus obtained to the symbol synchronizing portion 112.

The symbol synchronizing portion 112 estimates the delay profiles by using the transmission path estimate value group sent from the time direction transmission path estimating portion 18. The symbol synchronizing portion 112 corrects the delay profiles by using the data on the position of the center of gravity. Also, the symbol synchronizing portion 112 determines the FFT start times from the delay profiles after the completion of the correction, and supplies the data on the FFT start times to the FFT portion 16. Such a series of processing executed by the symbol synchronizing portion 112 will be referred hereinafter to as "the symbol synchronizing processing." Details of the symbol synchronizing portion 112 and the symbol synchronizing processing will be described later.

[Configuration of Symbol Synchronizing Portion 112]

Figure 14:
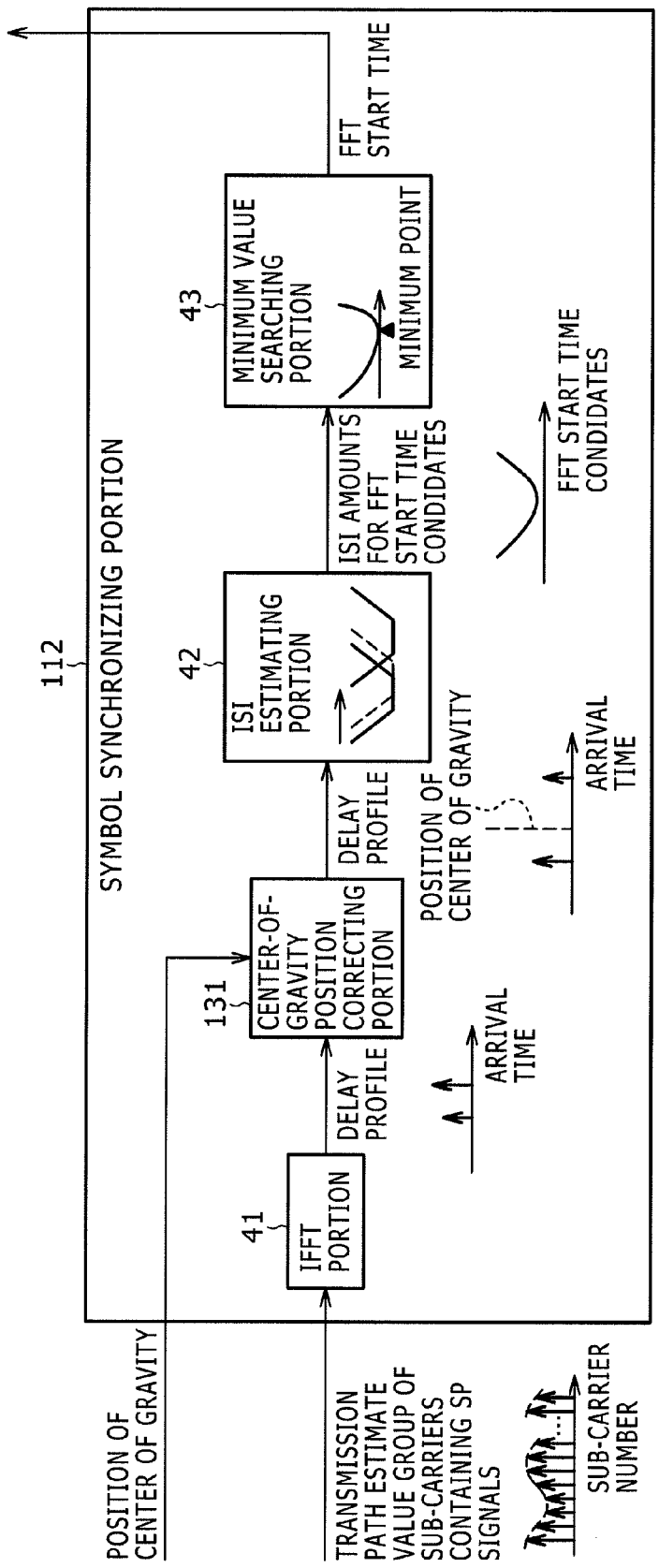
FIG. 14 is a block diagram showing a detailed configuration of a symbol synchronizing portion shown in FIG. 13.

FIG. 14 is a block diagram showing a detailed configuration of the symbol synchronizing portion 112 shown in FIG. 13.

It is noted that in FIG. 14, portions corresponding to those in FIG. 5 are designated by the same reference numerals, respectively, and a description thereof is suitably omitted here for the sake of simplicity.

The symbol synchronizing portion 112 shown in FIG. 14 has basically the same configuration as that of the symbol synchronizing portion 15 shown in FIG. 5. However, a center-of-gravity position correcting portion 131 is added as a block for correcting the delay profiles based on the position of the center of gravity to the symbol synchronizing portion 112 shown in FIG. 14.

That is to say, the symbol synchronizing portion 112 is composed of the IFFT portion 41, the ISI estimating portion 42, the minimum value searching portion 43, and the center-of-gravity position correcting portion 131.

[Details of Processing by Center-of-Gravity Position Correcting Portion 131]

The center-of-gravity position correcting portion 131 corrects the delay profiles so that the position of the center of gravity the data on which is sent from the IFFT portion 41 becomes a center, and supplies the data on the delay profiles after completion of the correction to the ISI estimating portion 42. That is to say, the center-of-gravity position correcting portion 131 rotates with the specific delay profile as a reference position. For example, the center-of-gravity position correcting portion 131 deletes the delay profile, which exists at a distance of Tu/6 or more away from the position of the center of gravity, of all the delay profiles. The center-of-gravity position correcting portion 131 newly adds an aliasing delay profile, of the delay profile thus deleted, which exists at a distance of Tu/6 or less from the central position of the profile instead.

Figure 15A:
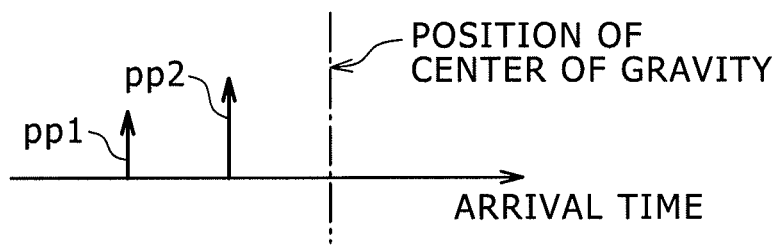
FIGS. 15A and 15B are respectively time-line charts explaining correction for a delay profile made by a center-of-gravity position correcting portion shown in FIG. 14.
Figure 15B:
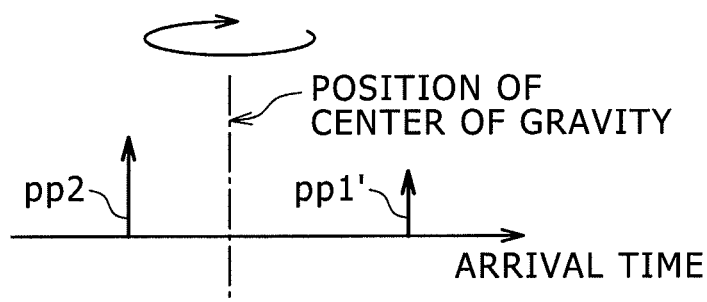

FIGS. 15A and 15B are respectively time-line charts explaining the correction for the delay profile made by the center-of-gravity position correcting portion 131 of FIG. 14.

FIG. 15A is a time-line chart showing the delay profiles before the correction. Also, FIG. 15B is a time-line chart showing the delay profiles after the correction.

Referring to FIG. 15A, the delay profiles pp1 and pp2 exist as the delay profiles before the correction.

Now, it is assumed that as shown in FIG. 15A, the position of the center of gravity is given on the right-hand side with respect to the delay profile pp2.

The center-of-gravity position correcting portion 131 deletes the delay profile, which exists at a distance of Tu/6 or more from the position of the center of gravity, of the delay profiles pp1 and pp2. As a result, as shown in FIG. 15B, the delay profile pp1 is deleted. The center-of-gravity position correcting portion 131 newly adds an aliasing delay profile pp1', of the delay profile pp1 thus deleted, which exists at a distance of Tu/6 or less from the central position of the profile instead. As a result, as shown in FIG. 15B, the delay profile pp1' is newly added.

That is to say, in FIG. 15B, the delay profile pp1' of the delay profiles pp1 and pp1' is set as the true delay profile. Therefore, the post-echo is identified.

In the manner as described above, the center-of-gravity position correcting portion 131 identifies the pre-echo and the post-echo, thereby making it possible to correct the error of the delay profile. In other words, the center-of-gravity position correcting portion 131 can enhance the estimation precision for the delay profiles by using the estimation information on the position of the center of gravity. Therefore, the center-of-gravity position correcting portion 131 can enhance the estimation precision for the ISI amounts, and as a result, can determine the FF interval with the high precision.

[Processing by Symbol Synchronizing Portion 112]

Figure 16:
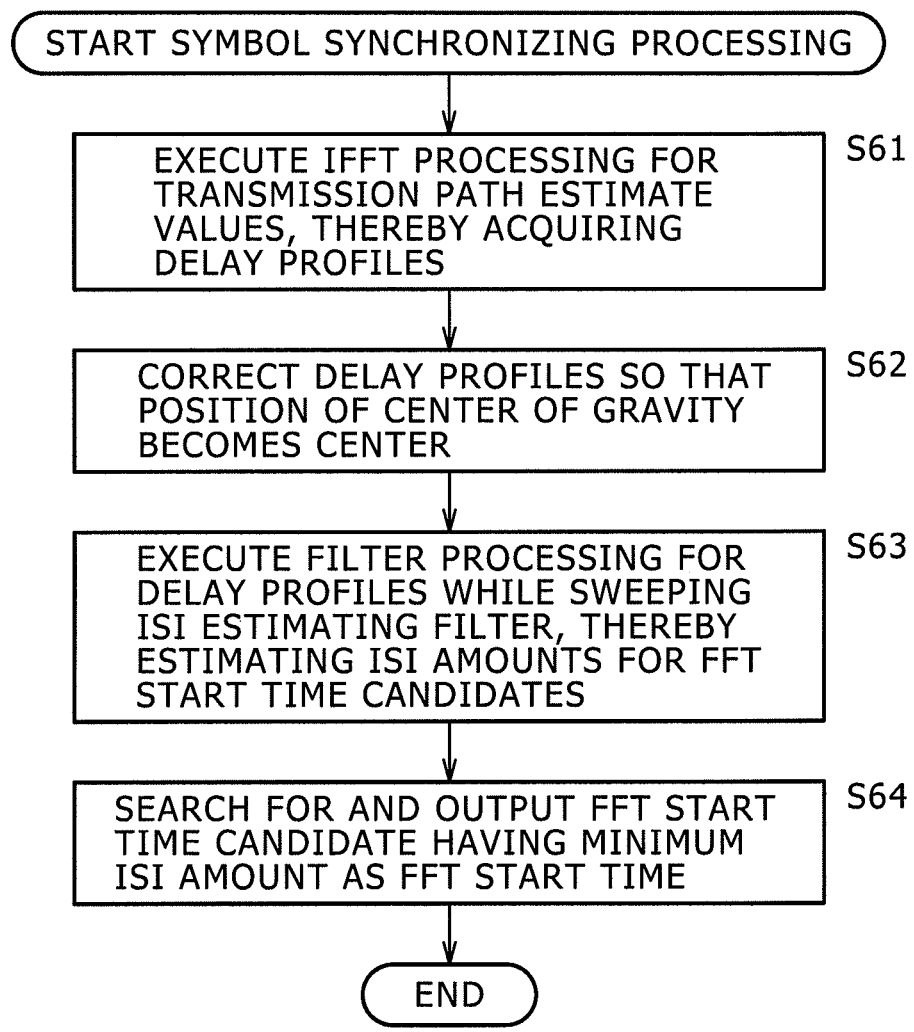
FIG. 16 is a flow chart explaining processing executed by a symbol synchronizing portion shown in FIG. 14.

FIG. 16 is a flow chart explaining processing executed by the symbol synchronizing portion 112 shown in FIG. 14.

It is noted that processing in Step S61 shown in FIG. 16 is the same as that in Step S21 shown in FIG. 11. In addition, processing in Steps S63 and S64 shown in FIG. 16 is the same as that in Steps S22 and S23 shown in FIG. 11. Therefore, a description of the processing in Steps S61, S63 and S64 is omitted here for the sake of simplicity.

In Step S62, the center-of-gravity position correcting portion 131 of the symbol synchronizing portion 112 corrects the delay profiles so that the position of the center of gravity from the IFFT portion 41 becomes the center, and supplies the data on the delay profiles after completion of the correction to the ISI estimating portion 42.

3. Third Embodiment

Next, an OFDM demodulator according to the third embodiment of the present invention will be described in detail.

With the OFDM demodulator of the third embodiment, when FFT window processing is executed, the suitable FFT interval is obtained.

For the purpose of facilitating the understanding of the OFDM demodulator of the third embodiment, firstly, a description will be given with respect to the FFT window processing, and the FFT interval suitable when FFT window processing is executed.

There is known the processing for enhancing the S/N ratio after completion of the FFT processing by using the interval of the GI not affected by the ISI (hereinafter referred to as "the GI interval not affected by the ISI") under the short delay spreading environment, that is, under the environment having the smaller delay spreading than the GI interval. That processing is the FFT window processing. The FFT window processing, for example, is described in Japanese Patent Laid-Open No. 2005-303440. The FFT interval suitable when the FFT window processing is executed means such an FFT interval that the GI interval not affected by the ISI can be maximally taken.

[Configuration of OFDM Modulator]

Figure 17:
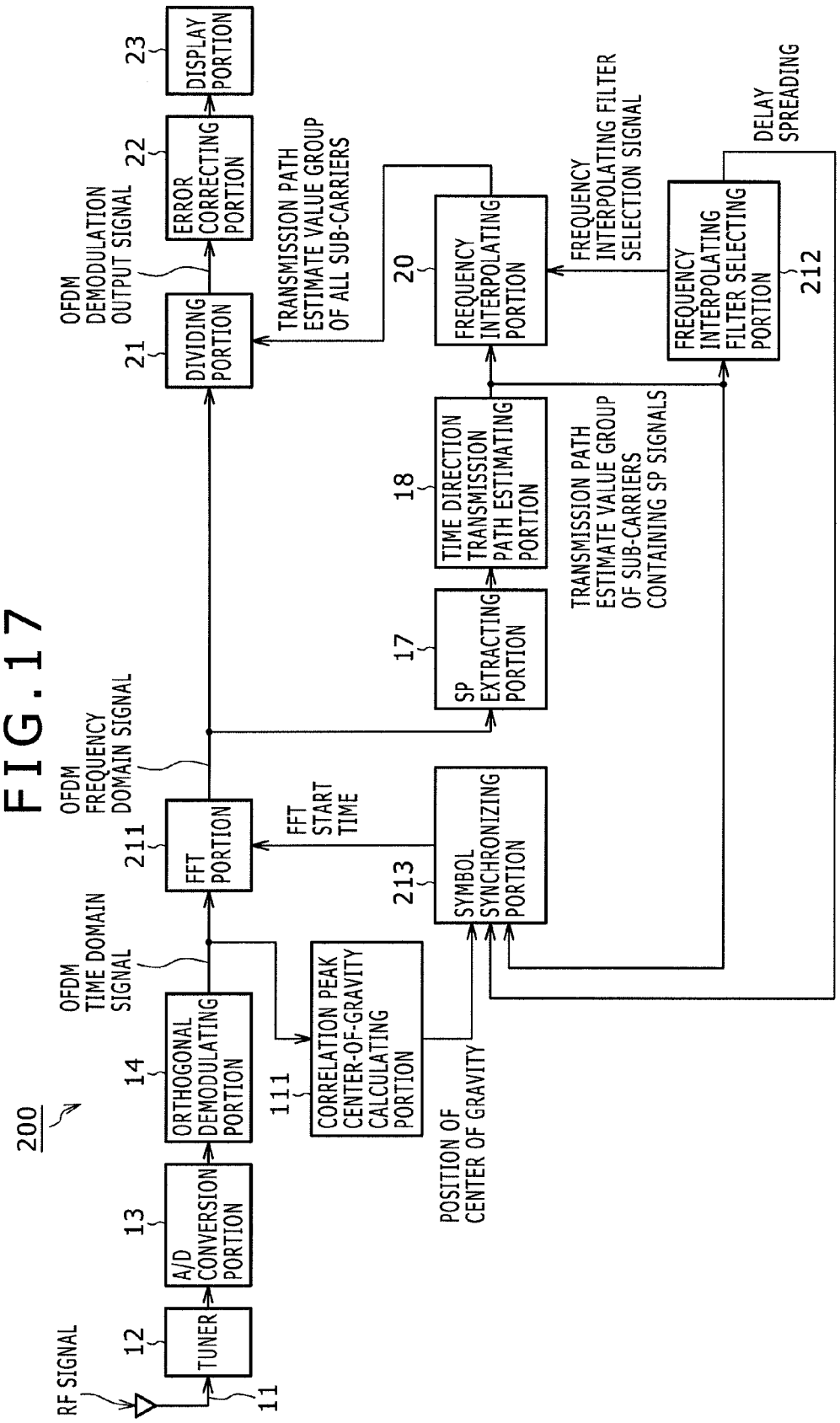
FIG. 17 is a block diagram showing a configuration of an OFDM demodulator according to a third embodiment of the present invention.

FIG. 17 is a block diagram showing a configuration of the OFDM demodulator according to the third embodiment of the present invention.

It is noted that in FIG. 17, portions corresponding to those shown in FIG. 13 are designated by the same reference numerals, respectively, and a description thereof is suitably omitted here for the sake of simplicity.

The OFDM modulator 200 shown in FIG. 17 has basically the same configuration as that of the OFDM demodulator 100 shown in FIG. 13. However, the OFDM modulator 200 shown in FIG. 17 is provided with an FFT portion 211 and a frequency interpolating filter selecting portion 212 instead of being provided with the FFT portion 16 and the frequency interpolating filter selecting portion 19 in the OFDM demodulator 100 shown in FIG. 13. Also, the OFDM demodulator 200 in FIG. 17 is further provided with a symbol synchronizing portion 213 instead of being provided with the symbol synchronizing portion 112 in the OFDM demodulator 100 shown in FIG. 13.

That is to say, the OFDM demodulator 200 is provided with the antenna 11, the tuner 12, the A/D conversion portion 13, the orthogonal demodulating portion 14, the SP extracting portion 17, the time direction transmission path estimating portion 18, and the frequency interpolating portion 20. Also, the OFDM demodulator 200 is further provided with the dividing portion 21, the error correcting portion 22, the display portion 23, the correlation peak center-of-gravity calculating portion 111, the FFT portion 211, the frequency interpolating filter selecting portion 212, and the symbol synchronizing portion 213.

The frequency interpolating filter selecting portion 212 obtains the delay spreading from the transmission path estimate values of the sub-carriers containing therein the SP signals, and supplies data on the delay spreading to the symbol synchronizing portion 213. Here, the delay spreading means the time domain in which the true delay profiles are distributed. For example, the frequency interpolating filter selecting portion 212 obtains the true delay profiles from the transmission path estimate value group of the sub-carriers containing therein the SP signals. The frequency interpolating filter selecting portion 212 obtains the delay spreading from the true delay profiles thus obtained.

[Delay Spreading]

Figures 18A, 18B:
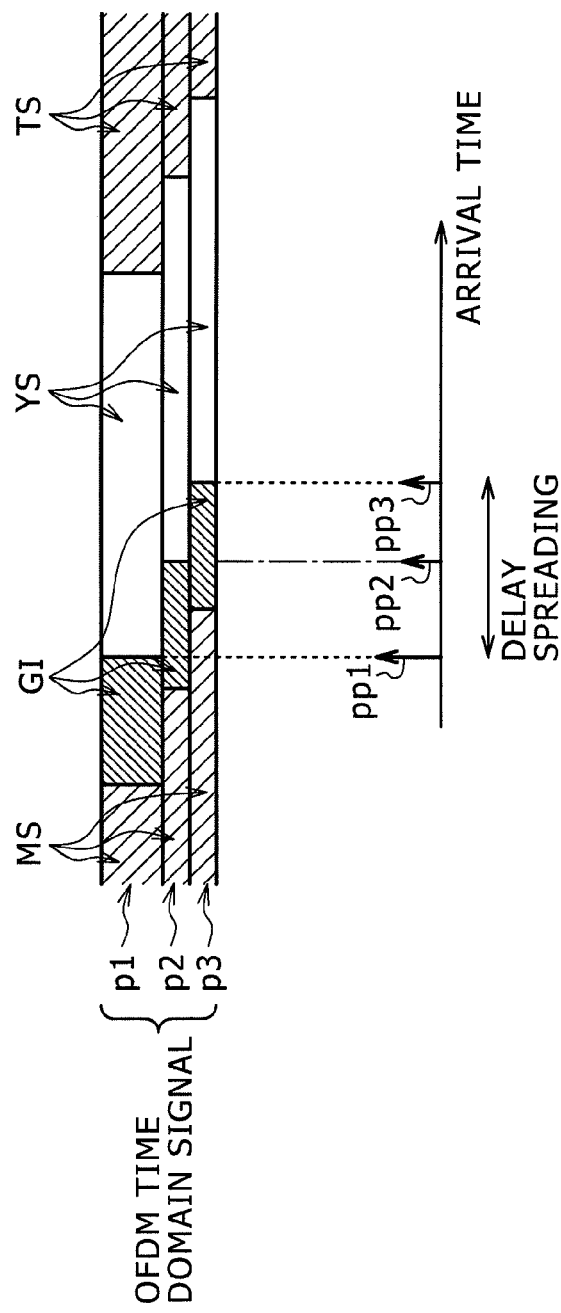
FIGS. 18A and 18B are respectively a diagram and a time-line chart explaining delay spreading.

FIGS. 18A and 18B are respectively a diagram and a time-line chart explaining the delay spreading.

FIG. 18A is a diagram showing a structure of the OFDM time domain signal. Also, FIG. 18B is a time-line chart of the true delay profiles.

Referring to FIG. 18B, the true delay profiles pp1 to pp3 exist in the order from the left-hand side in the figure. Therefore, the time domain ranging from the temporarily most anterior delay profile pp1 to the temporarily most posterior delay profile pp3 of the true delay profiles pp1 to pp3 is obtained as the delay spreading.

The symbol synchronizing portion 213 determines the FFT start times from the transmission path estimate value group from the time direction transmission path estimating portion 18 by using the delay spreading and the position of the center of gravity, and supplies data on the FFT start times thus determined to the FFT portion 211. As a result, the FFT interval is also determined. In addition, the symbol synchronizing portion 213 determines the GI interval not affected by the ISI from the delay spreading, and informs the FFT portion 211 of the GI interval not affected by the ISI. Such a series of processing executed by the symbol synchronizing portion 213 will be referred hereinafter to as "the symbol synchronizing processing." Details of the symbol synchronizing portion 213 and the symbol synchronizing processing will be described later.

The FFT portion 211 sets a suitable FFT window in consideration of the GI interval not affected by the ISI, and executes the FFT processing for the delay profiles. The FFT portion 211 supplies the signal after completion of the execution of the FFT processing as the OFDM frequency domain signal to the dividing portion 21.

[Configuration of Symbol Synchronizing Portion 213]

Figure 19:
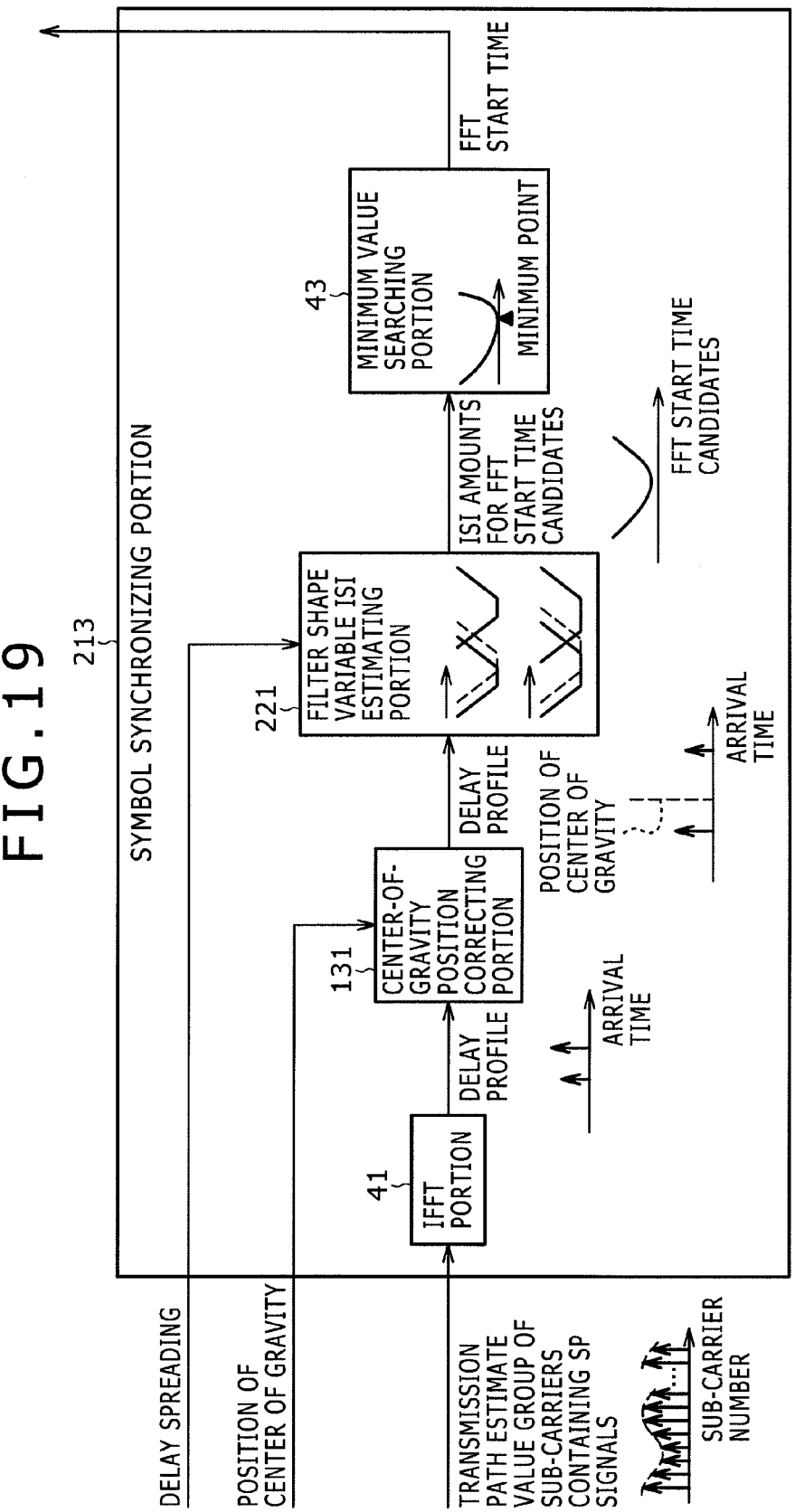
FIG. 19 is a block diagram showing a detailed configuration of a symbol synchronizing portion shown in FIG. 17.

FIG. 19 is a block diagram showing a detailed configuration of the symbol synchronizing portion 213 shown in FIG. 17.

In FIG. 19, portions corresponding to those shown in FIG. 14 are designated by the same reference numerals, respectively, and a description thereof is suitably omitted here for the sake of simplicity.

The symbol synchronizing portion 213 shown in FIG. 19 is provided with a filter shape variable ISI estimating portion 221 instead of being provided with the ISI estimating portion 42 shown in FIG. 14.

That is to say, the symbol synchronizing portion 213 is composed of the IFFT portion 41, the minimum value searching portion 43, the center-of-gravity position correcting portion 131, and the filter shape variable ISI estimating portion 221.

The filter shape variable ISI estimating portion 221 changes the filter shape of the ISI estimating filter FI in accordance with the delay spreading. The filter shape variable ISI estimating portion 221 executes the filter processing for the delay profiles after completion of the correction sent from the center-of-gravity position correcting portion 131 by using the ISI estimating filter FI while sweeping the ISI estimating filter FI after completion of the change of the filter shape. As a result, the ISI amounts for the FFT start time candidates are estimated.

[Processing by Filter Shape Variable ISI Estimating Portion 221]

FIGS. 20A, 20B and 20C are respectively a diagram, a time-line chart and a graphical representation explaining processing executed by the filter shape variable ISI estimating portion 221 shown in FIG. 19.

FIG. 20A is a diagram showing a structure of the OFDM time domain signal. FIG. 20B is a time-line chart showing the delay profiles. Also, FIG. 20C is a graphical representation showing a filter shape of the ISI estimating filter FI.

The ISI estimating filter FI shown in FIG. 20C has basically the same shape as that of the ISI estimating filter FI shown in FIG. 7. However, with the ISI estimating filter FI shown in FIG. 20B, a length of an interval in which the filter coefficient becomes zero (hereinafter referred to as "a zero interval") is changed in accordance with the delay spreading. That is to say, the length of the zero interval is changed into a length of the delay spreading.

That is to say, this means that the delay spreading and the zero interval usually agree with each other. Therefore, the front end f2 of the zero interval of the ISI estimating filter agrees with the temporarily most anterior delay profile of all the delay profiles. In this case, the back end f1 of the zero interval also agrees with the temporarily most posterior delay profile of all the delay profiles. Therefore, when the ISI estimating filter is disposed in the filter position fulfilling this condition, the ISI amount is estimated to be zero. On the other hand, even when the ISI estimating filter is shifted in any of the time directions from the filter position fulfilling this condition, the ISI amount becomes larger than zero. Therefore, when the length of the zero interval is changed to the length of the delay spreading, only one FFT start time candidate at which the ISI amount becomes minimum is usually obtained.

[Result of Search by Minimum Value Searching Portion 43]

FIGS. 21A and 21B are respectively a graphical representation and a diagram explaining a result of searching for the FFT start time candidates by the minimum value searching portion 43 shown in FIG. 19.

FIG. 21A is a graphical representation showing the ISI amounts for the FFT start time candidates. Also, FIG. 21B is a diagram showing a structure of the OFDM time domain signal.

It is noted that the ISI amounts for the FFT start time candidates shown in FIG. 21A are obtained by executing the filter processing for the delay profiles shown in FIG. 21B by using the ISI estimating filter.

As shown in FIG. 21A as well, when the zero interval of the ISI estimating filter FI is set at the length of the delay spreading, only one FFT start time candidate at which the ISI amount becomes minimum is obtained. The only one FFT start time candidate thus obtained is set as the FFT start time. As a result, as shown in FIG. 21B, a boundary between the GI in the temporarily anterior path p1 of the paths p1 and p2, and the effective symbol YS is obtained as the FFT start time. As a result, the GI interval not affected by the ISI becomes maximum. As a result, it is possible to enhance the S/N ratio after completion of the execution of the FFT processing.

[Symbol Synchronizing Processing]

Figure 22:
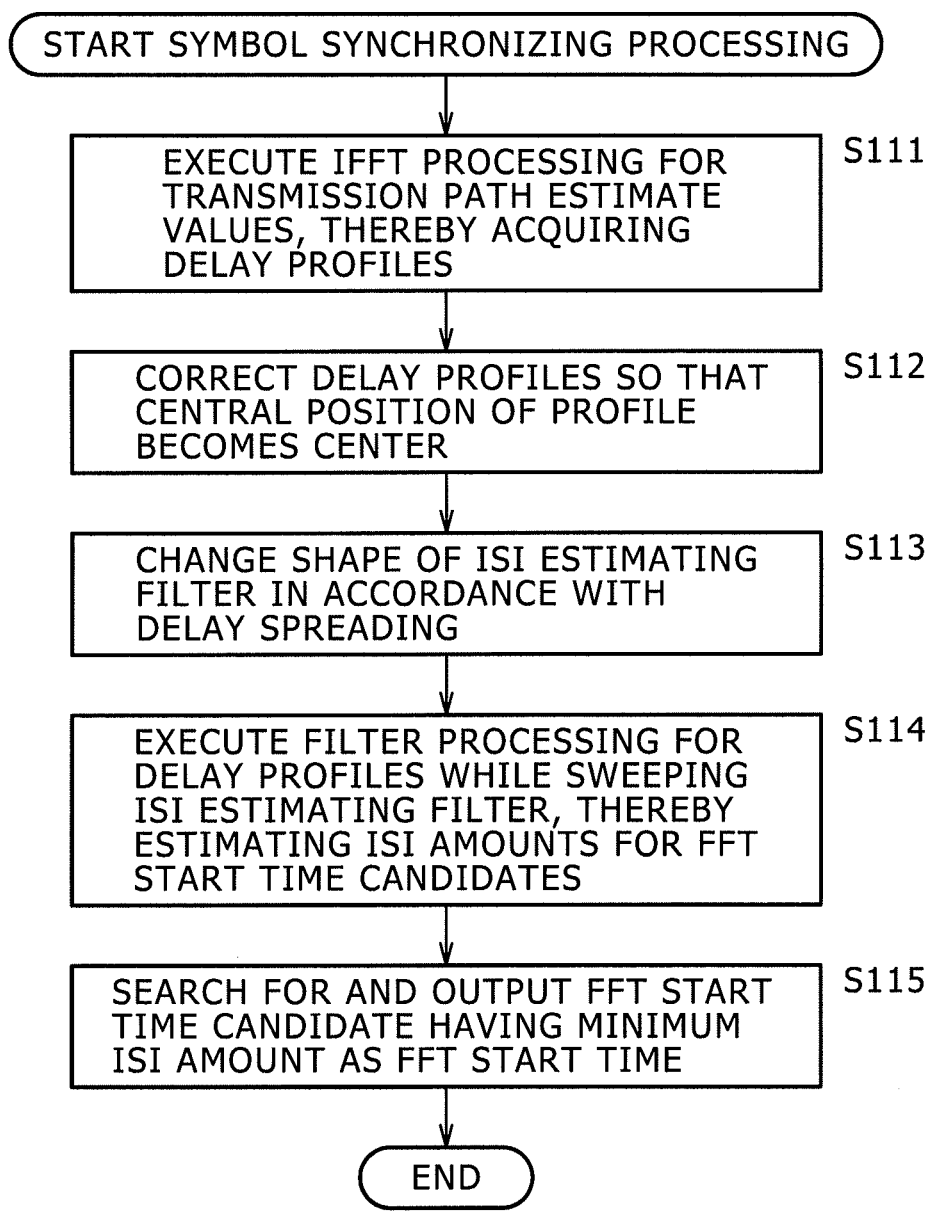
FIG. 22 is a flow chart explaining processing executed by a symbol synchronizing portion shown in FIG. 19.

FIG. 22 is a flow chart explaining processing executed by the symbol synchronizing portion 213 shown in FIG. 19.

It is noted that processing in Steps S111 and S112 shown in FIG. 22 is identical to the processing in Steps S61 and S62 shown in FIG. 16. Also, processing in Steps S114 and S115 shown in FIG. 22 is identical to the processing in Steps S63 and S64 shown in FIG. 16. Therefore, a description of the processing in Steps S111 and S112, and in Steps S114 and S115 is omitted here for the sake of simplicity.

In Step S113, the filter shape variable ISI estimating portion 221 changes the filter shape of the ISI estimating filter FI in accordance with the delay spreading.

4. Fourth Embodiment

Next, an OFDM demodulator according to the fourth embodiment of the present invention will be described in detail.

With the OFDM demodulator of the fourth embodiment as well, the suitable FFT interval is obtained when the FFT window processing is executed.

[Configuration of OFDM Demodulator]

Figure 23:
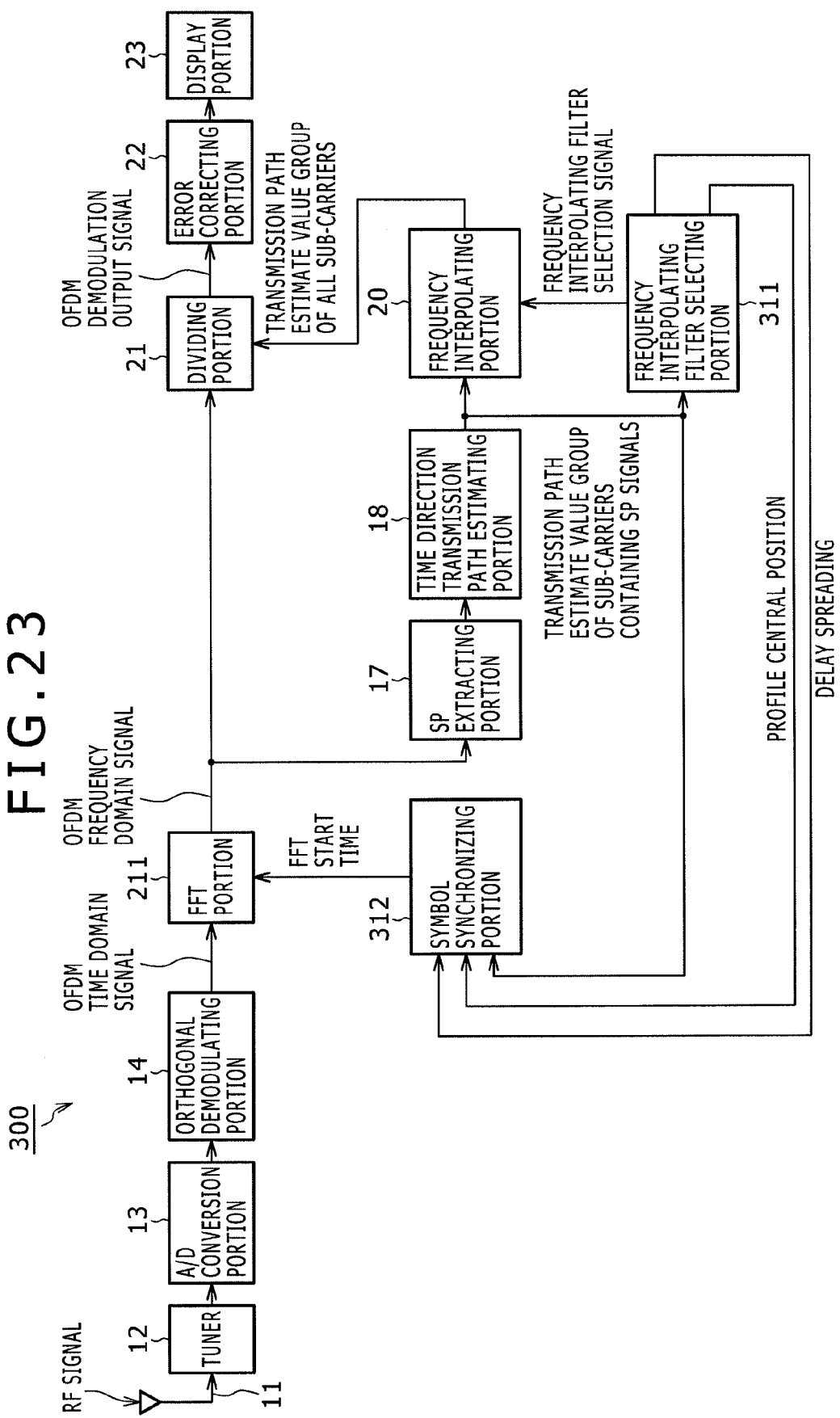
FIG. 23 is a block diagram showing a configuration of an OFDM demodulator according to a fourth embodiment of the present invention.

FIG. 23 is a block diagram showing a configuration of the OFDM demodulator of the fourth embodiment.

It is noted that in FIG. 23, portions corresponding to those in FIG. 17 are designated by the same reference numerals, respectively, and a description thereof is suitably omitted here for the sake of simplicity.

The OFDM demodulator 300 shown in FIG. 23 has basically the same configuration as that of the OFDM demodulator 200 shown in FIG. 17. However, the OFDM demodulator 300 shown in FIG. 23 is provided with a frequency interpolating filter selecting portion 311 and a symbol synchronizing portion 312 instead of being provided with the frequency interpolating filter selecting portion 212 and the symbol synchronizing portion 213 in the OFDM demodulator 200 shown in FIG. 17. In addition, the correlation peak center-of-gravity calculating portion 111 in the OFDM demodulator 200 shown in FIG. 17 is removed in the OFDM demodulator 300 shown in FIG. 23. With the correlation peak center-of-gravity calculating portion 111, the position of the center of gravity as the reference position is obtained. Instead of the correlation peak center-of-gravity calculating portion 111, with the frequency interpolating filter selecting portion 311, a profile central position which will be described later as a reference position is obtained.

That is to say, the OFDM demodulator 300 is provided with the antenna 11, the tuner 12, the A/D conversion portion 13, the orthogonal demodulating portion 14, the SP extracting portion 17, the time direction transmission path estimating portion 18, and the frequency interpolating portion 20. Also, the OFDM demodulator 300 is further provided with the dividing portion 21, the error correcting portion 22, the display portion 23, the FFT portion 211, the frequency interpolating filter selecting portion 311, and the symbol synchronizing portion 312.

The frequency interpolating filter selecting portion 311 obtains the filter kind of the frequency interpolating filter used in the frequency interpolating portion 20 based on the transmission path estimate value group of the sub-carriers containing therein the SP signals so as to maximize the S/N ratio after completion of equalization. In addition, the frequency interpolating filter selecting portion 311 obtains the central position of the time domain becoming the filtering object as the profile central position so as to maximize the S/N ratio after completion of equalization. Also, the frequency interpolating filter selecting portion 19 supplies a frequency interpolating filter signal representing the filter kind thus selected to the frequency interpolating portion 20. In addition, the frequency interpolating filter selecting portion 311 supplies the data on the profile central position thus obtained to the symbol synchronizing portion 312. Moreover, the frequency interpolating filter selecting portion 311 obtains the delay spreading from the transmission estimate values of the sub-carriers containing therein the SP signals, and supplies the data on the delay spreading thus obtained to the symbol synchronizing portion 312.

The symbol synchronizing portion 312 determines the FFT start times from the transmission path estimate value group sent from the time direction transmission path estimating portion 18 by using the profile central position and the delay spreading, and supplies the data on the FFT start times to the FFT portion 211. As a result, the FFT interval is also determined. Such a series of processing executed by the symbol synchronizing portion 312 will be referred hereinafter to as "the symbol synchronizing processing." Details of the symbol synchronizing portion 312 and the symbol synchronizing processing will be described later.

[Configuration of Symbol Synchronizing Portion 312]

Figure 24:
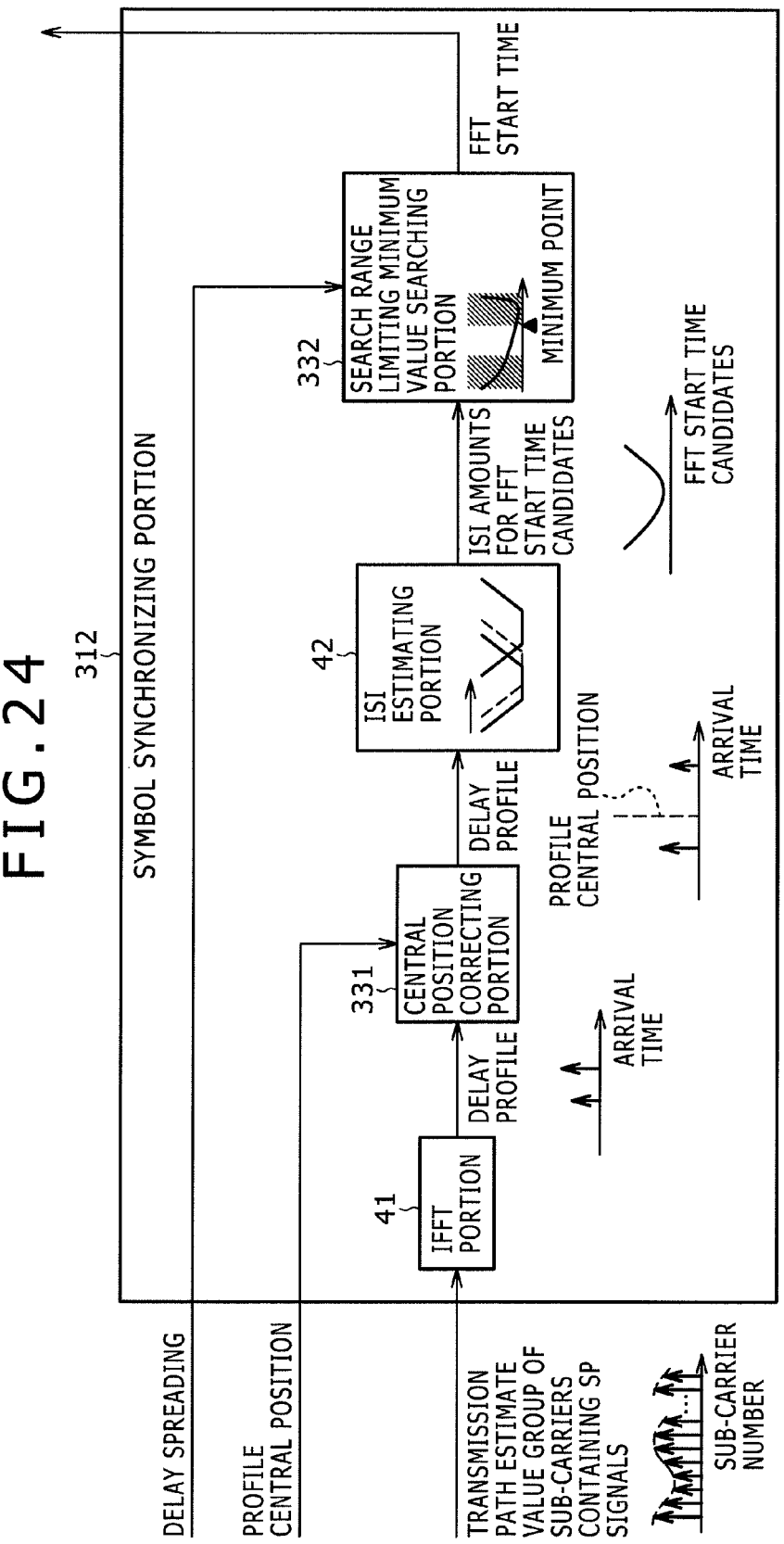
FIG. 24 is a block diagram showing a detailed configuration of a symbol synchronizing portion shown in FIG. 23.

FIG. 24 is a block diagram showing a detailed configuration of the symbol synchronizing portion 312 shown in FIG. 23.

In FIG. 24, portions corresponding to those shown in FIG. 19 are designated by the same reference numerals, respectively, and a description thereof is suitably omitted here for the sake of simplicity.

The symbol synchronizing portion 312 shown in FIG. 24 is provided with the ISI estimating portion 42 (refer to FIG. 14) and a searching range limiting minimum value searching portion 332 instead of being provided with the filter shape variable ISI estimating portion 221 and the minimum value searching portion 43 shown in FIG. 19. Also, the symbol synchronizing portion 312 shown in FIG. 24 is further provided with a central portion correcting portion 331 instead of being provided with the center-of-gravity position correcting portion 131 shown in FIG. 19.

That is to say, the symbol synchronizing portion 312 is composed of the IFFT portion 41, the ISI estimating portion 42, the central position correcting portion 331, and the searching range limiting minimum value searching portion 332.

It is noted that the central position correcting portion 331 executes basically the same processing as that executed by the center-of-gravity correcting portion 131. However, with the central position correcting portion 331, the correction is carried out for the delay profiles by using the profile central position instead of using the position of the center of gravity.

[OFDM Time Domain Signal Received by ISI Estimating Portion 42]

Figures 25A, 25B:
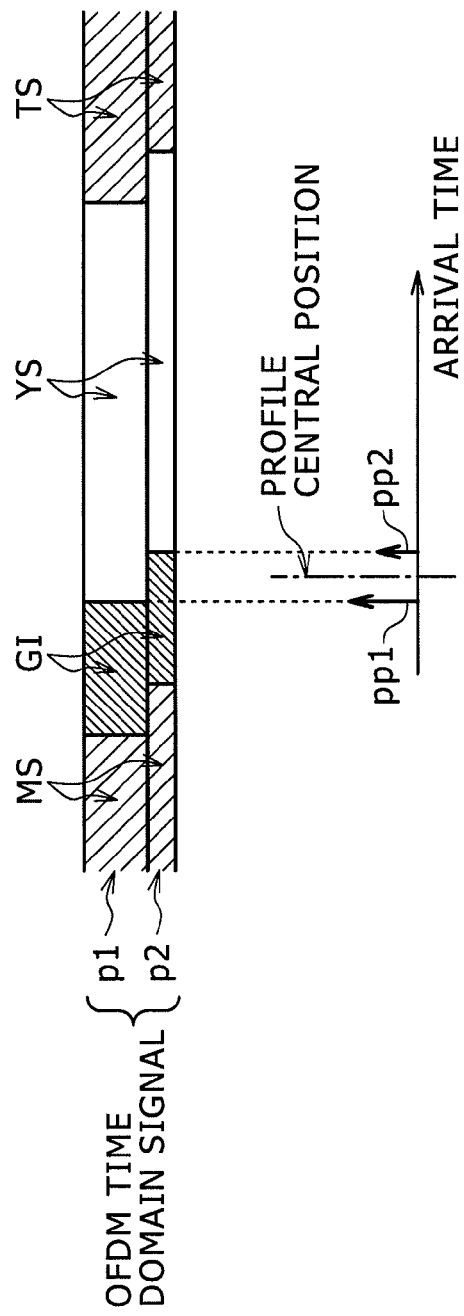
FIGS. 25A and 25B are respectively a diagram and a time-lime chart showing an OFDM time domain signal received at an ISI estimating portion shown in FIG. 24.

FIGS. 25A and 25B are respectively a diagram and a time-line chart showing the OFDM time domain signal received by the ISI estimating position 42 shown in FIG. 24.

FIG. 25A is a diagram showing a structure of the OFDM time domain signal. Also, FIG. 25B is a time-line chart showing the delay profiles.

The OFDM time domain signal shown in FIG. 25 is composed of the two paths p1 and p2.

It is noted that in this case as well, there is suppressed the environment in which the short delay spreading environment, that is, the delay spreading is smaller than the GI interval.

With the ISI estimating portion 42, the filter processing is executed for the delay profiles shown in FIG. 25B while the ISI estimating filter FI shown in FIG. 7 is swept. In this case, there is acquired the ISI amount, as shown in FIG. 26A which will be described later, for the FFT start time candidates.

[Processing by Searching Range Limiting Minimum Value Searching Portion 332]

The searching range limiting minimum value searching portion 332 is a block in which a function of limiting the searching interval for the FFT start time candidates in accordance with the delay spreading is added to the minimum value searching portion 43 shown in FIG. 6, etc. The searching range limiting minimum value searching portion 332, for example, limits the searching interval for the FFT start time candidates to an interval ranging from a position which lies anterior to the block file central position by ½ of the delay spreading to a position which lies posterior to the profile central position by ½ of the delay spreading. The searching range limiting minimum value searching portion 332 searches for the FFT start time candidate having the minimum ISI amount from the search interval thus limited.

Figure 26A:
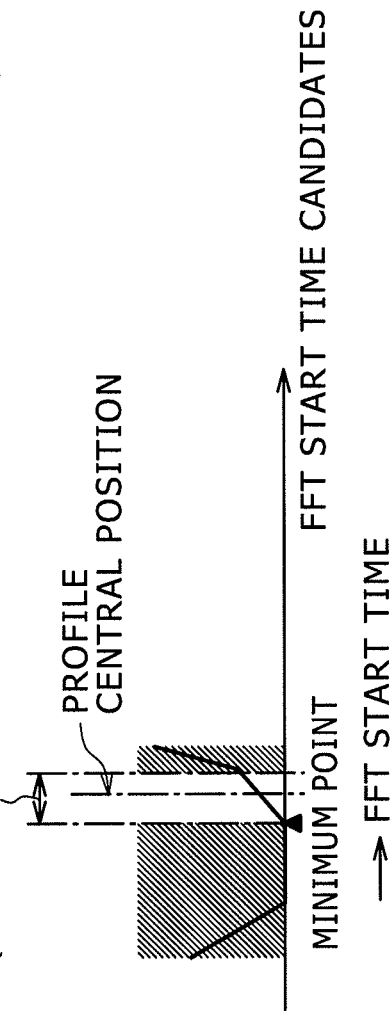
FIGS. 26A and 26B are respectively a graphical representation and a diagram explaining processing executed by a search range limiting minimum value searching portion shown in FIG. 24.
Figure 26B:
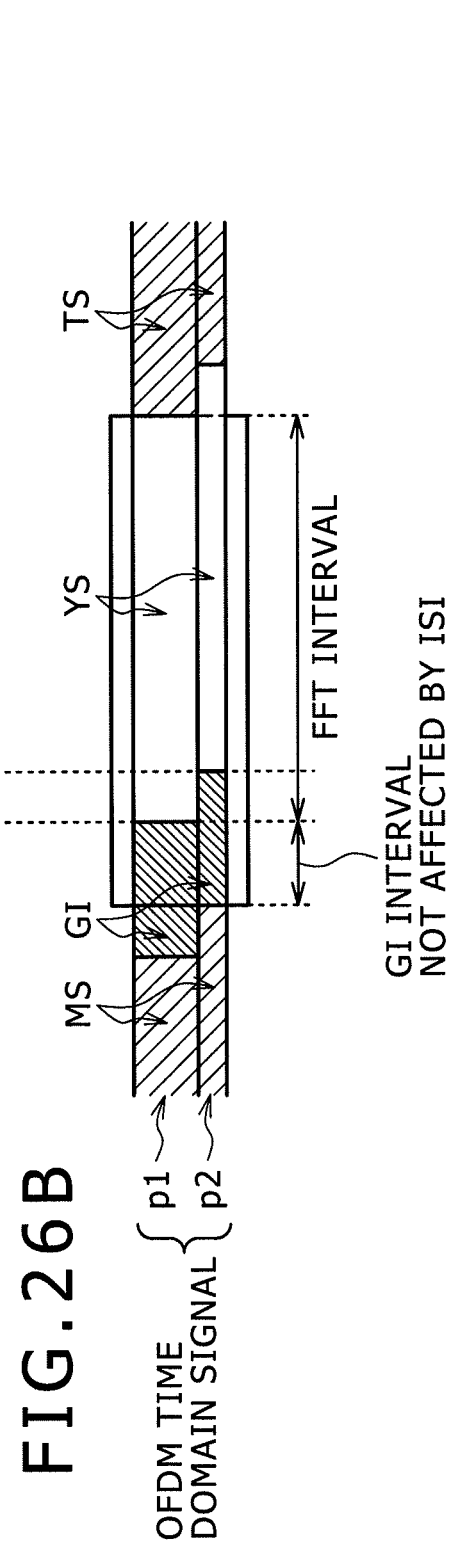

FIGS. 26A and 26B are respectively a graphical representation and a diagram explaining the processing executed by the searching range limiting minimum value searching portion 332 shown in FIG. 24.

FIG. 26A is a graphical representation showing the ISI amounts for the FFT start time candidates. Also, FIG. 26B is a diagram showing a result of searching for the FFT interval candidate having the minimum ISI amount.

It is noted that the ISI amounts for the FFI start time candidates shown in FIG. 26A, as previously stated, are obtained by executing the filter processing for the delay profiles shown in FIG. 25B by using the ISI estimating filters shown in FIG. 7.

Referring to FIG. 26A, the FFT start time candidate which lies anterior to the profile central position by ½ of the delay spreading is searched for as the FFT start time candidate having the minimum ISI amount from the search interval (the interval not hatched in the figure). It is noted that the FFT start time candidate which lies anterior to the profile central position by ½ of the delay spreading will be referred hereinafter to as "the FFT start time candidate of the pre-echo position." In many cases, not only this example, the FFT start time candidate of the pre-echo position is searched for as the FFT start time candidate having the minimum ISI amount.

The search range limiting minimum value searching portion 332 determines the FFT start time candidate thus searched for as the FFT start time. As a result, as shown in FIG. 26B, a time corresponding to a boundary between the GI in the temporarily anterior path p1 of the paths p1 and p2, and the effective symbol YS is obtained as the FFT start time. Thus, the GI interval not affected by the ISI becomes maximum. As a result, it is possible to obtain the same effect about the S/N ratio enhancement after completion of the FFT processing as that in the case of the third embodiment.

[Processing by Symbol Synchronizing Portion 312]

Figure 27:
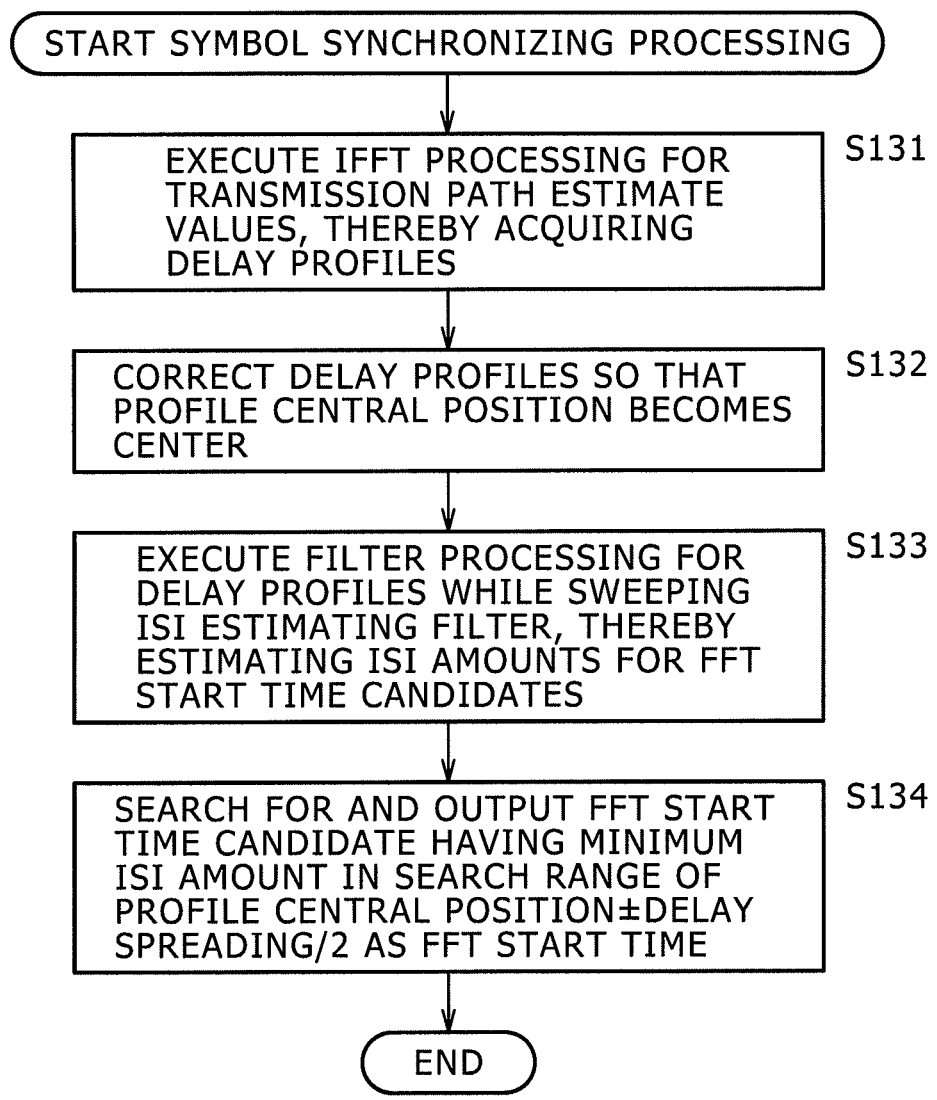
FIG. 27 is a flow chart explaining processing executed by a symbol synchronizing portion shown in FIG. 24.

FIG. 27 is a flow chart explaining the processing executed by the symbol synchronizing portion 312 shown in FIG. 24.

It is noted that the processing in Step S131 shown in FIG. 27 is identical to the processing in Step S111 shown in FIG. 22. Also, the processing in Step S133 shown in FIG. 27 is identical to the processing in Step S63 shown in FIG. 16. Therefore, a description of the processing in Steps S131 and S133 is omitted here for the sake of simplicity.

In Step S132, the central position correcting portion 331 of the symbol synchronizing portion 312 corrects the delay profiles so that the profile central position the data on which is supplied from the IFFT portion 41 becomes a center, and supplies the delay profiles thus corrected to the ISI estimating portion 42.

In Step S134, the search range limiting minimum value searching portion 332 limits the search interval for the FFT start time candidates to an interval ranging frame position which lies anterior to the profile central position by ½ of the delay spreading to a position which lies posterior to the profile central position by ½ of the delay spreading. The search range limiting minimum value searching portion 332 searches for the FFT start time candidate having the minimum ISI amount from the search interval thus limited, and outputs the data on the FFT start time candidate having the minimum ISI amount thus searched for.

Note that, a method of determining a simple FFT start time when the FFT window processing is executed (hereinafter referred to as "a simple FFT start time determining method") will now be described in connection with the method of determining the FFT start time by the symbol synchronizing portion 312 shown in FIG. 24.

With the method of determining the simple FFT start time, the FFT start times are determined through simple calculation from the profile central position and the delay spreading.

That is to say, with the method of determining the simple FFT start time, (the profile central position−the delay spreading/2) is obtained as the FFT start time candidate of the pre-echo position. The FFT start time candidate of the pre-echo position is set as the FFT start time, thereby making it possible to determine the same real FFT start position as that in the symbol synchronizing portion 312.

The series of processing described above can be executed by hardware or can be executed by software. When the series of processing is executed by the software, a program composing the software is installed from a program recording medium in a computer incorporated in dedicated hardware. Or, various kinds of programs are installed from the program recording medium, for example, in a general purpose personal computer which can execute various kinds of functions.

[Configuration of Hardware]

Figure 28:
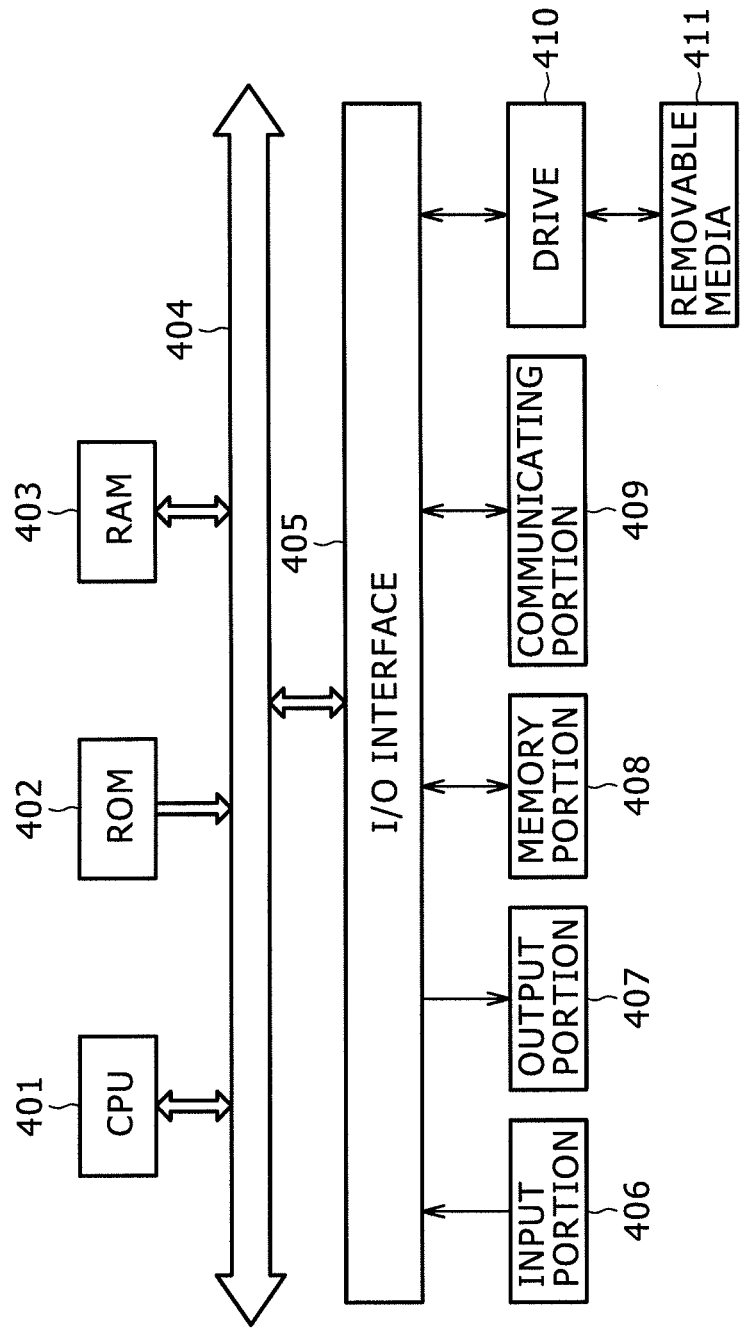
FIG. 28 is a block diagram showing a configuration of hardware of a computer to which the present invention is applied.

FIG. 28 is a block diagram showing a configuration of hardware of a computer which executes the series of processing described above by using a program.

In the computer, a CPU 401, a Read Only Memory (ROM) 402, and a Random Access Memory (RAM) 403 are connected to one another through a bus 404.

An I/O interface 405 is further connected to the bus 404. An input portion 406 such as a keyboard, a mouse or a microphone, an output portion 407 such as a display device or a speaker, a memory portion 408 such as a hard disc or a non-volatile memory are connected to the I/O interface 405. Moreover, a communicating portion 409 such as a network interface, and a drive 410 for driving a removable media 411 such as a magnetic disc, an optical disc, a magnet-optical disc or a semiconductor memory are further connected to the I/O interface 405.

With the computer configured in the manner as described above, the CPU 401 loads the program, for example, stored in the memory portion 408 into the RAM 403 through the I/O interface 405 and the bus 404, and executes the program thus loaded thereinto, thereby executing the series of processing described above.

The program which the computer (the CPU 401) is intended to execute, for example, is recorded in the removable media 411 as the magnetic disc (including a flexible disc) to be provided. The program is recorded in the removable media 411 as a package media to be provided. It is noted that an optical disc (such as a Compact Disc-Read Only Memory (CD-ROM)), a Digital Versatile Disc (DVD), a magnet-optical disc, a semiconductor memory or the like is used as the package media. Alternatively, the program is provided through a wireless or wired transmission medium such as a Local Area Network (LAN), the Internet or a Digital Satellite Broadcasting (DSB).

Also, the program can be installed in the memory portion 408 through the I/O interface 405 by mounting the removable media 411 to the drive 410. In addition, the program can be received at the communicating portion 409 through the wireless or wired transmission media to be installed in the memory portion 408. In addition thereto, the program can be previously installed in either the ROM 402 or the memory portion 408.

It is noted that the program which the computer is intended to execute may be a program in accordance with which the processing is executed in a time series manner in the order described herein, or may be a program in accordance with which the processing is executed in parallel with one another, or at a necessary timing, for example, when a calling is made.

In addition, the embodiments of the present invention are by no means limited to the embodiments described above, and thus various changes can be made without departing from the gist of the present invention.

The present application contains subject matter related to that disclosed in Japanese Priority Patent Application JP 2008-250285 filed in the Japan Patent Office on Sep. 29, 2008, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. An information processor, comprising:
receiving means for receiving an orthogonal frequency division multiplexing signal transmitted in accordance with an orthogonal frequency division multiplexing system;
fast Fourier transform arithmetically operating means for carrying out fast Fourier transform for a signal within a predetermined interval of the orthogonal frequency division multiplexing signal received by said receiving means;
delay profile estimating means for estimating delay profiles from the orthogonal frequency division multiplexing signal received by said receiving means;
inter-symbol interference amount estimating means for estimating inter-symbol interference amounts for a plurality of candidates for the predetermined interval, respectively, by using the delay profiles estimated by said delay profile estimating means; and
searching means for searching for the candidate having the minimum inter-symbol interference amount estimated by said inter-symbol interference amount estimating means from among the plurality of candidates in the predetermined interval, and supplying data on the candidate thus searched for as the predetermined interval to said fast Fourier transform arithmetically operating means.

2. The information processor according to claim 1, wherein in said inter-symbol interference amount estimating means, a filter in which a filter coefficient representing an inter-symbol interference interval changes in a time direction, and has a shape of a change that is a downward projecting shape disposed in each filter position corresponding to the plurality of candidates for the predetermined interval, respectively, and filter processing is executed for the delay profiles by using said filter, thereby estimating the inter-symbol interference amounts for the plurality of candidates.

3. The information processor according to claim 2, wherein a range, in which the filter having the downward projecting shape has a minimum inter-symbol interference, is identical to a range of a guard interval length of the orthogonal frequency division multiplexing signal.

4. The information processor according to claim 1, further comprising reference position estimating means for estimating a reference position for the delay profiles estimated by said delay profile estimating means;
wherein said inter-symbol interference amount estimating means corrects the delay profiles by using data on the reference position estimated by said reference position estimating means, and estimates the inter-symbol interference amounts by using the delay profiles after completion of the correction.

5. The information processor according to claim 1, further comprising delay spreading estimating means for estimating delay spreading of the delay profiles estimated by said delay profile estimating means;

wherein said searching means sets the plurality of candidates in the predetermined interval as primary selected candidates, selects secondary selected candidates based on the delay spreading estimated by said delay spreading estimating means from among the primary selected candidates, and searches for the candidate having the minimum inter-symbol interference amount estimated by said inter-symbol interference amount estimating means from among the secondary selected candidates thus selected, and supplies data on the candidate thus searched for as the predetermined interval to said fast Fourier transform arithmetically operating means.

6. The information processor according to claim 2, further comprising delay spreading estimating means for estimating delay spreading of the delay profile estimated by said delay profile estimating means;
wherein said inter-symbol interference amount estimating means further changes the shape of the filter in accordance with the delay spreading estimated by said delay spreading estimating means, and executes filter processing for the delay profiles by using the filter after completion of the further changes of the shape of the filter.

7. A display device, comprising:
receiving means for receiving an orthogonal frequency division multiplexing signal transmitted in accordance with an orthogonal frequency division multiplexing system;
fast Fourier transform arithmetically operating means for carrying out fast Fourier transform for a signal within a predetermined interval of the orthogonal frequency division multiplexing signal received by said receiving means;
displaying means for displaying thereon an image corresponding to the orthogonal frequency division multiplexing signal for which the fast Fourier transform is carried out by said fast Fourier transform arithmetically operating means;
delay profile estimating means for estimating delay profiles from the orthogonal frequency division multiplexing signal received by said receiving means;
inter-symbol interference amount estimating means for estimating inter-symbol interference amounts for a plurality of candidates in the predetermined interval respectively, by using the delay profiles estimated by said delay profile estimating means; and
searching means for searching for the candidate having the minimum inter-symbol interference amount estimated by said inter-symbol interference amount estimating means from among the plurality of candidates in the predetermined interval, and supplying data on the candidate thus searched for as the predetermined interval to said fast Fourier transform arithmetically operating means.

* * * * *